United States Patent
Snyder

(10) Patent No.: US 6,449,939 B1
(45) Date of Patent: Sep. 17, 2002

(54) PULSED DETONATION ENGINE WAVE ROTOR

(75) Inventor: Philip Harold Snyder, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/579,454

(22) Filed: May 26, 2000

(51) Int. Cl.$^7$ ............................. F02C 7/26; F02C 3/02
(52) U.S. Cl. ...................................... 60/39.06; 60/39.45
(58) Field of Search .............................. 60/39.06, 39.45

(56) References Cited

U.S. PATENT DOCUMENTS

| | | |
|---|---|---|
| 2,738,123 A | 3/1956 | Hussmann |
| 2,757,509 A | 8/1956 | Jendrassik |
| 2,759,660 A | 8/1956 | Jendrassik |
| 2,764,340 A | 9/1956 | Jendrassik |
| 2,766,928 A | 10/1956 | Jendrassik |
| 2,852,915 A | 9/1958 | Jendrassik |
| 2,864,237 A | 12/1958 | Coleman, Jr. |
| 2,901,163 A | 8/1959 | Waleffe |
| 2,937,498 A | 5/1960 | Schmidt |
| 2,940,656 A | 6/1960 | Spalding |
| 2,946,184 A | 7/1960 | Jendrassik |
| 2,952,986 A | 9/1960 | Spalding |
| 2,970,745 A | 2/1961 | Berchtold |
| 3,003,315 A | 10/1961 | Spalding |
| 3,078,034 A | 2/1963 | Spalding |
| 3,084,511 A | 4/1963 | Klapproth |
| 3,095,704 A | 7/1963 | Spalding |
| 3,234,736 A | 2/1966 | Spalding |
| 3,417,564 A | 12/1968 | Call |
| 3,483,697 A | 12/1969 | Ruffles et al. |
| 3,486,686 A | 12/1969 | Williamson |
| 3,879,937 A | 4/1975 | Jenny |
| 3,899,874 A | 8/1975 | Bailey et al. |
| 4,241,576 A | 12/1980 | Gertz |
| 4,679,393 A | 7/1987 | Hellat et al. |
| 4,719,746 A | 1/1988 | Keller |
| 4,887,942 A * | 12/1989 | Hauge .......................... 417/64 |
| 4,912,924 A | 4/1990 | Stockwell |
| 5,197,276 A | 3/1993 | Keller |
| 5,220,781 A | 6/1993 | Keller |
| 5,267,432 A | 12/1993 | Paxson |
| 5,274,994 A | 1/1994 | Chyou et al. |
| 5,297,384 A | 3/1994 | Paxson |
| 5,313,785 A | 5/1994 | Althaus et al. |
| 5,353,589 A | 10/1994 | Althaus et al. |
| 5,513,489 A | 5/1996 | Bussing |
| 5,522,217 A | 6/1996 | Zauner |
| 5,557,919 A | 9/1996 | Althaus |
| 5,894,719 A | 4/1999 | Nalim et al. |
| 5,916,125 A | 6/1999 | Snyder |

FOREIGN PATENT DOCUMENTS

CH 441868 8/1967

OTHER PUBLICATIONS

*Wave Rotor–Enhanced Gas Turbine Engines;* Gerard E. Welch, Scott M. Jones and Daniel E. Paxson; Jul. 10–12, 1995.

*Pulse Combustion and Wave Rotors for High–Speed Propulsion Engine,* Nalim and Jules, Indianapolis, IN and Cleveland, OH, Apr. 27–30, 1998.

*A Modified Through–Flow Wave Rotor Cycle With Combustor Bypass Ducts: Preliminary Report,* Paxson and Nalim, Cleveland, OH, Feb., 1997.

*Comptuational Analysis of Pulsed Detonation Engines and Applications,* S. Eidelman, W. Grossmann and I. Lottati, In Reno, Nevada, Jan. 08–11, 1990.

* cited by examiner

Primary Examiner—Charles G. Freay
(74) Attorney, Agent, or Firm—Woodard, Emhardt, Naughton, Moriarty & McNett

(57) ABSTRACT

A pulsed detonation engine wave rotor apparatus and method of using a pressure wave to compress a buffer gas disposed within the engine flow passages. The high pressure buffer gas is routed out of the wave rotor and subsequently reintroduced to the wave rotor to discharge and scavenge the latter stages of the combustion gas remaining under the engine flow passages.

52 Claims, 13 Drawing Sheets

○ DETONATION INITIATOR
—— SHOCK WAVE
—— DETONATION WAVE
······· EXPANSION WAVE
— — — GAS INTERFACE

PULSED DETONATION ENGINE WAVE ROTOR

BACKGROUND OF THE INVENTION

The present invention relates generally to a non-steady flow device utilizing pulse combustion to produce thrust. More particularly, in one embodiment of the present invention a wave rotor utilizing pulse detonation compresses an energy transfer gas disposed within the wave rotor flow passages. The compressed energy transfer gas is routed out of a first port of the wave rotor and reintroduced through a second port into the wave rotor to forcefully discharge and scavenge the latter stages of combustion gases within the wave rotor flow passages. Although the present invention was developed for use with wave rotor based pulsed detonation engines, certain applications may be outside of this field.

A wave rotor is generally thought of as a generic term and describes a class of machines utilizing transient internal fluid flow to efficiently accomplish a desired flow process. Since the 1940's wave rotors have been studied by engineers and scientists and thought of as particularly suitable for a propulsion system. Wave rotors depend on wave phenomena as the basis of their operation, and these wave phenomena have the potential to be exploited in novel propulsion systems which include benefits such as higher specific power and lower specific fuel consumption.

There are a variety of wave rotor devices that have been conceived of over the years. While these prior wave rotors and methods of using transient gas flows are steps in the right direction the need for additional improvement still remains. The present invention satisfies this need in a novel and unobvious way.

SUMMARY OF THE INVENTION

One form of the present invention contemplates a pulsed combustion wave rotor engine utilizing a flow of buffer gas to scavenge the latter stages of the expansion and enhance the discharge of combusted gas from the rotor. The present invention contemplates a device having rotatable passageways or rotatable endplates with ports therein.

Another form of the present invention contemplates a method, comprising: introducing a quantity of working fluid into a passageway of a wave rotor; placing a fuel within one end of the passageway; combusting the fuel within the passageway and creating a quantity of combusted gas adjacent the one end of the passageway and compressing a portion of the working fluid within the passageway to define a high pressure buffer gas adjacent the combusted gas within the passageway; discharging the high pressure buffer gas out of the passageway; discharging a first portion of the combusted gas out of the passageway; and routing the high pressure buffer gas from the discharging back into the passageway to purge a second portion of the combusted gas out of the passageway.

In another form of the present invention there is contemplated a method, comprising: providing a wave rotor device including a rotatable rotor with a plurality cells adapted for the passage of fluid therethrough, the rotor having a direction of rotation; rotating the rotor to pass the plurality of cells by a plurality of inlet ports and a plurality of outlet ports; flowing a working fluid through one of the plurality of inlet ports and into at least one of the cells; introducing a fuel into the at least one of the cells at the inlet end portion; detonating the fuel and a first portion of the working fluid within the at least one of the cells, the detonating forming combusted gas and compressing a second portion of the working fluid to define a high pressure buffer gas; discharging the high pressure buffer gas through one of the plurality of outlet ports; discharging a first portion of the combusted gas through another of the plurality of outlet ports; and routing in the direction of rotation of the rotor the high pressure buffer gas from the one of the plurality of outlet ports and reintroducing through another of the plurality of inlet ports into the at least one of the cells to discharge a second portion of the combusted gas from the cell.

In a further form of the present invention there is contemplated a method, comprising: providing a wave rotor device including a plurality of stationary passageways adapted for the passage of fluid therethrough; rotating a plurality of inlet ports and a plurality of outlet ports by the plurality of stationary passageways to control the passage of fluid into and out of the stationary passageways, the plurality of ports having a direction of rotation; flowing a working fluid through one of the plurality of inlet ports and into at least one of the stationary passageways; introducing a fuel into the at least one of the stationary passageways; detonating the fuel and a first portion of the working fluid within the at least one of the stationary passageways, said detonating forming combusted gas and compressing a second portion of the working fluid to define a high pressure buffer gas; discharging the high pressure buffer gas through one of the plurality of outlet ports; discharging a first portion of the combusted gas through another of the plurality of outlet ports; and routing in the direction of rotation of the ports the high pressure buffer gas from the one of the plurality of outlet ports and reintroducing through another of the plurality of inlet ports into the at least one of the stationary passageways to discharge a second portion of the combusted gas from the passageway.

One object of the present invention is to provide a unique pulsed combustion engine wave rotor.

Related objects and advantages of the present invention will be apparent from the following description.

DESCRIPTION OF THE PREFERRED EMBODIMENTS

Figure 1:
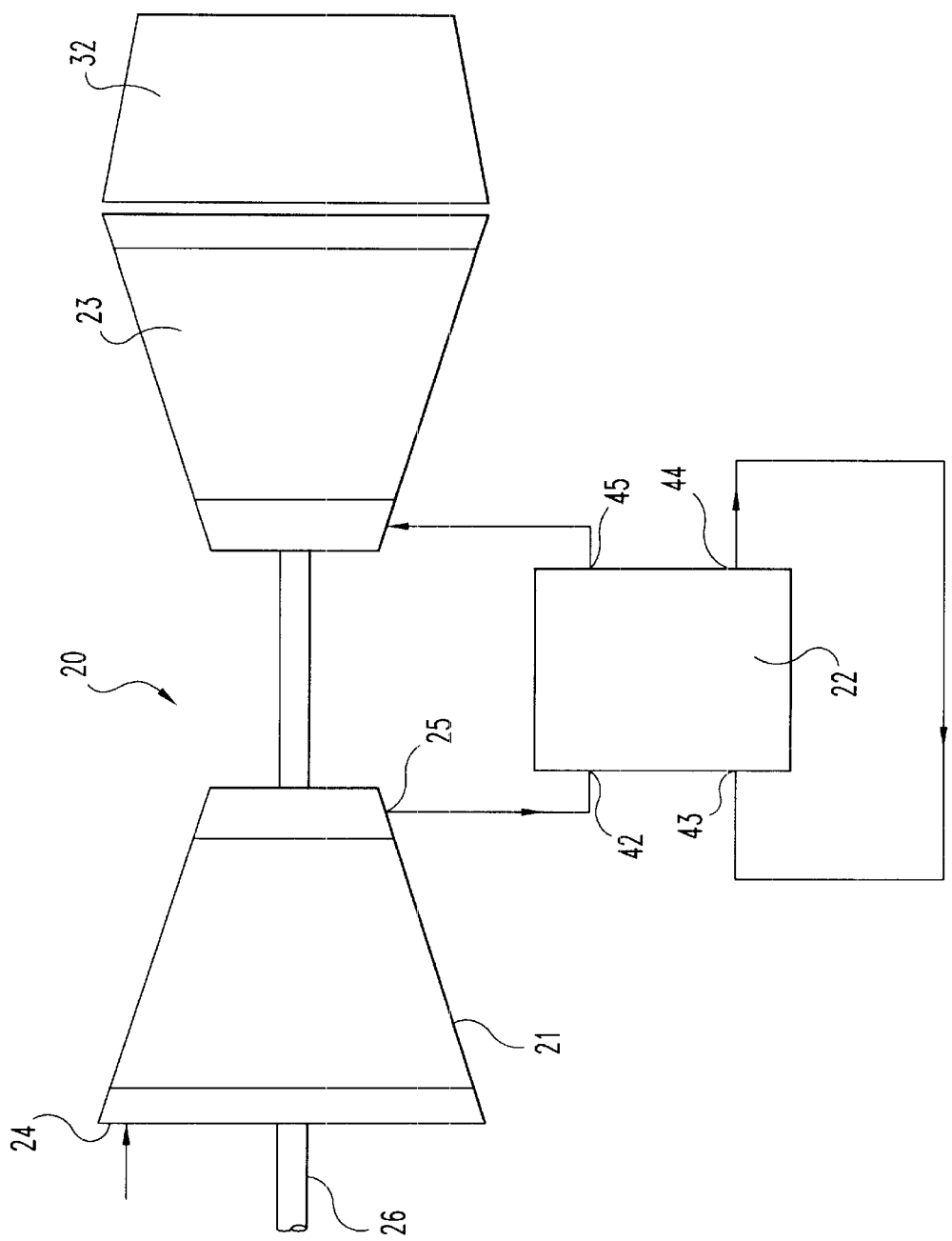
FIG. 1 is a schematic representation of a propulsion system comprising a compressor, a pulsed combustion engine wave rotor, a turbine, a nozzle and an output power shaft.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of a propulsion system 20 which includes a compressor 21, a pulsed combustion wave rotor 22, a turbine 23, a nozzle 32, and an output power shaft 26. The compressor 21 delivers a precompressed working fluid to the pulsed combustion wave rotor device 22. Wave rotor device 22 has occurring within its passageways the combustion of a fuel and air mixture, and thereafter the combusted gases are delivered to the turbine 23. The working fluid that is precompressed by the compressor 21 and delivered to the wave rotor device 22 is selected from a group including oxygen, nitrogen, carbon dioxide, helium or a mixture thereof, and more preferably is air. In one embodiment the pulsed combustion wave rotor device 22 replaces the compressor diffuser and combustor of a conventional gas turbine engine. The present invention contemplates both a pulsed detonation combustion process and a pulsed deflagration combustion process. While the present invention will generally be described in terms of a pulsed detonation combustion process, it also contemplates a pulsed deflagration combustion process.

In one embodiment the components of the propulsion system 20 have been integrated together to produce an aircraft flight propulsion engine capable of producing either shaft power or direct thrust or both. The term aircraft is generic and includes helicopters, airplanes, missiles, unmanned space devices and other substantially similar devices. It is important to realize that there are multitudes of ways in which the propulsion engine components can be linked together. Additional compressors and turbines could be added with inter-coolers connected between the compressors and reheat combustion chambers could be added between the turbines. The propulsion system of the present invention is suited to be used for industrial applications, such as but not limited to pumping sets for gas or oil transmission lines, electricity generation and naval propulsion. Further, the propulsion system of the present invention is also suitable to be used for ground vehicular propulsion requiring the use of shaft power such as automobiles and trucks.

Figure 2:
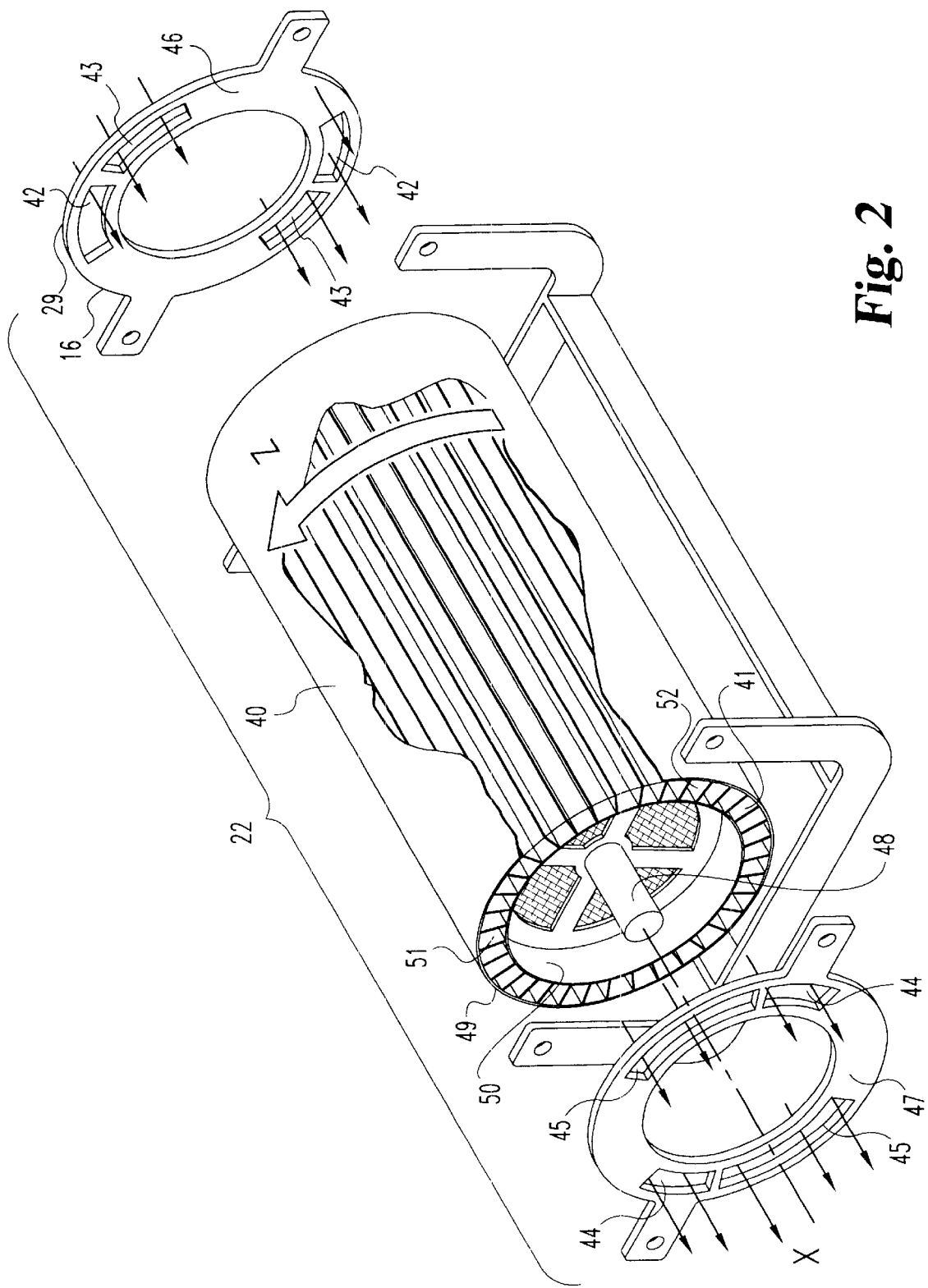
FIG. 2 is a partially exploded view of one embodiment of a pulsed combustion engine wave rotor comprising a portion of FIG. 1.
Figure 3:
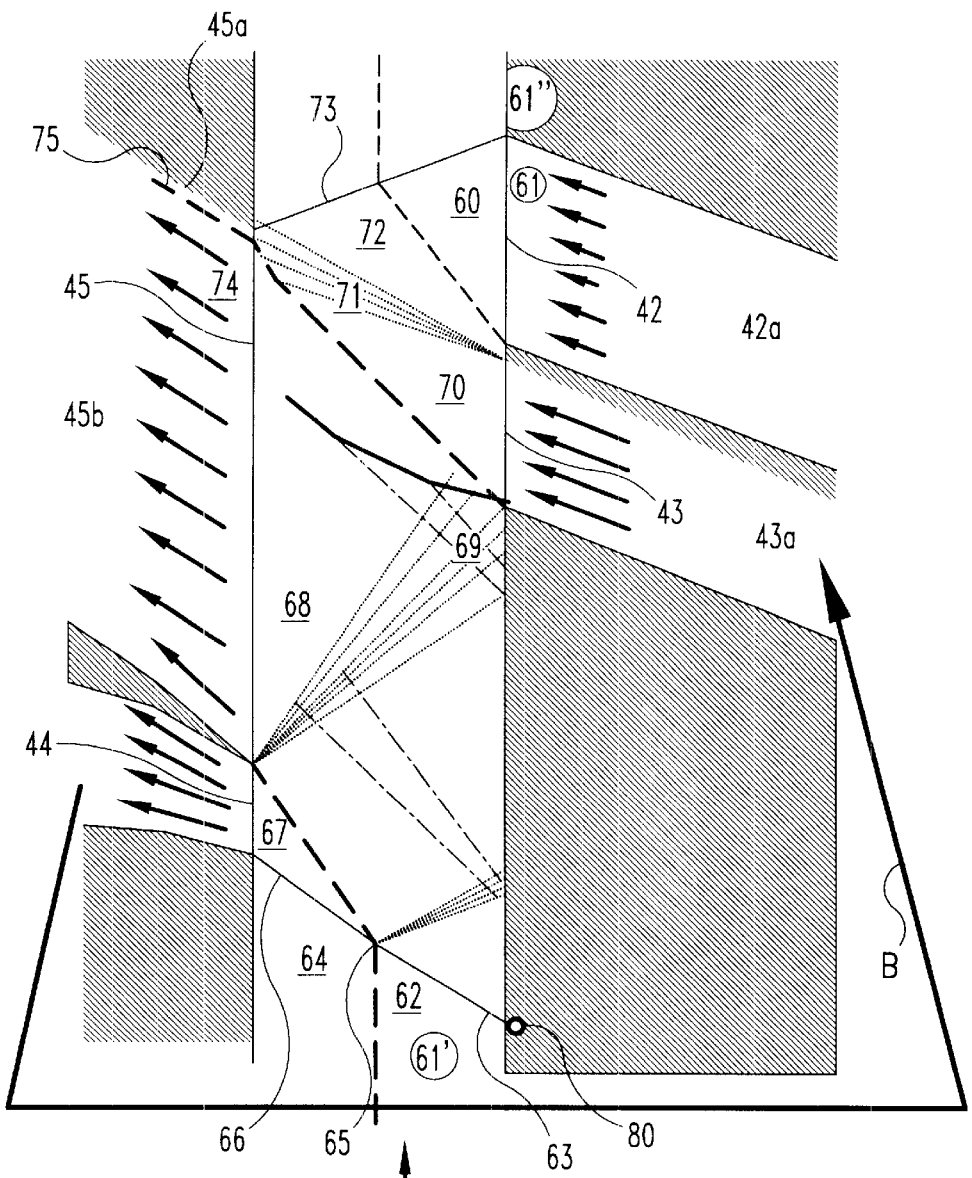
FIG. 3 is a space-time (wave) diagram for one embodiment of a pulsed detonation engine wave rotor of the present invention wherein the high-pressure energy transfer gas outlet port and the exhaust gas to-turbine port are on the same end of the device.

With reference to FIGS. 1–3, further aspects of the propulsion system 20 will be described. Compressor 21 is operable to increase the pressure of the working fluid between the compressor inlet 24 and the compressor outlet 25. The increase in working fluid pressure is represented by a pressure ratio (pressure at outlet/pressure at inlet) and the working fluid is delivered to a first wave rotor inlet port 42. The first wave rotor inlet port 42 generally defines a working fluid inlet port and is not intended to be limited to an inlet port that is coupled to the outlet of a conventional turbomachinery component. A second wave rotor inlet port 43 is referred to as a buffer gas inlet port, and is located adjacent to and sequentially prior to the first wave rotor inlet port 42. Wave rotor inlet ports 42 and 43 form an inlet port sequence, and multiple inlet port sequences can be integrated into a waver rotor device. In one preferred embodiment there are two inlet port sequences disposed along the circumference of the wave rotor device.

Wave rotor device 22 has an outlet port sequence that includes an outlet port 45 and a buffer gas outlet port 44. The outlet port 45 generally defines a combusted gas outlet port and is not intended to be limited to an outlet port that is coupled to a turbine. In the preferred embodiment of propulsion system 20 the outlet port 45 is defined as to-turbine outlet port 45. The to-turbine outlet port 45 in propulsion system 20 allows the combusted gases to exit the wave rotor device 22 and pass to the turbine 23. Compressed buffer gas exits the buffer gas outlet port 44 and is reintroduced into the rotor passageways 41 through the second wave rotor inlet port 43. In one embodiment the buffer gas outlet port 44 and the second wave rotor inlet port 43 are connected in fluid communication by a duct. In one form the duct between the outlet port 44 and outlet port 43 is integral with the wave rotor device 22 and passes through the interior of rotor 40. In another form the duct passes through the center of shaft 48. In another form of the present invention the duct is physically external to the wave rotor device 22.

Figure 1A:
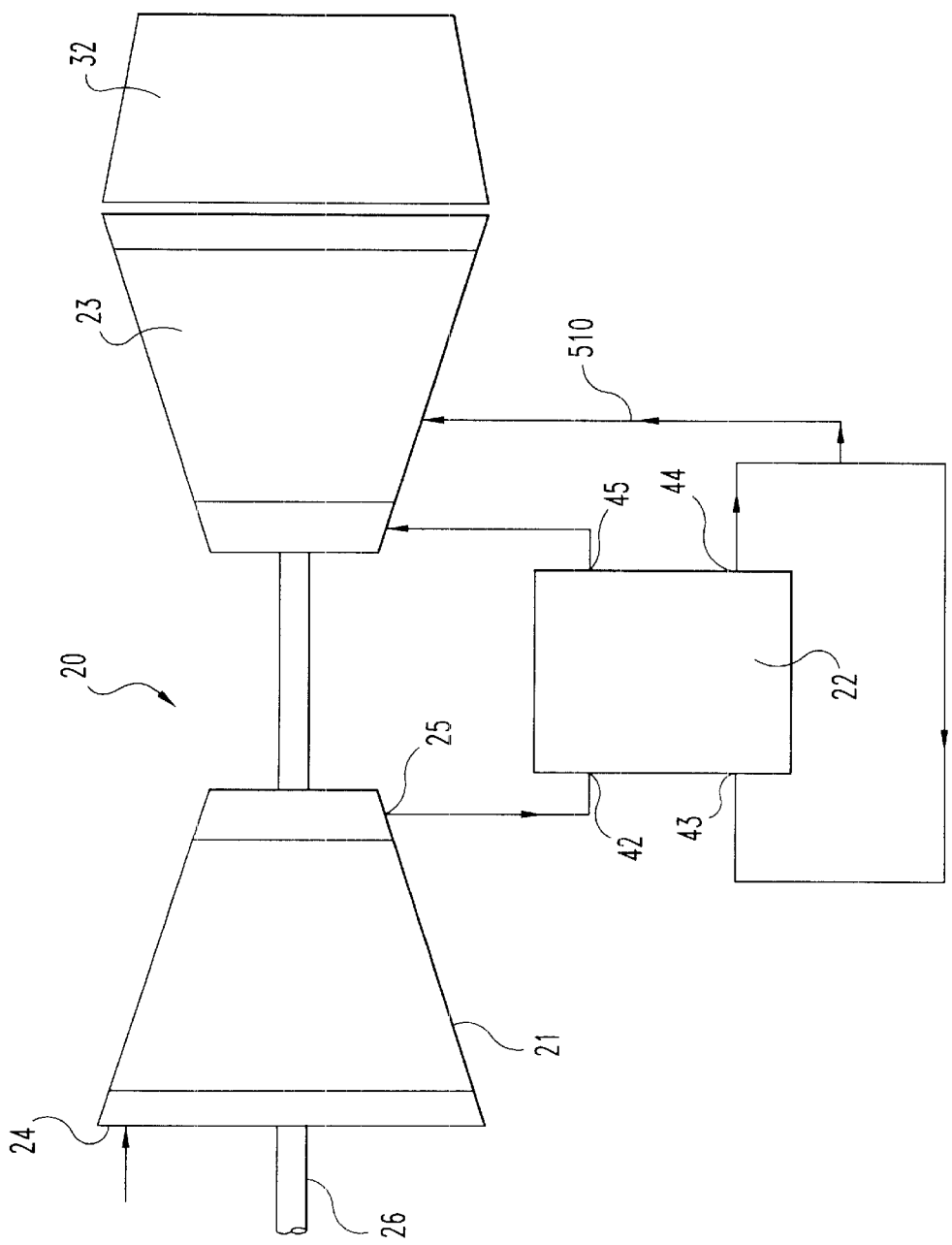
FIG. 1a is a schematic representation of an alternate embodiment of a propulsion system comprising a compressor, a pulsed combustion engine wave rotor, a turbine, a nozzle and an output power shaft.

The reintroduced compressed buffer gas does work on the remaining combusted gases within the rotor passageways 41 and causes the pressure in region 70 to remain at an elevated level. The relatively high energy flow of combusted gases from the to-turbine port 45 is maintained in region 74 by the reintroduction of the high pressure buffer gas entering through the second wave rotor inlet port 43. The flow of the high pressure buffer gas from buffer gas outlet port 44 to the second wave rotor inlet port 43 is illustrated schematically by arrow B in FIG. 3. In one form of the present invention a portion of the high pressure buffer gas exiting through outlet port 44 can be used as a source of turbine cooling fluid. More specifically, in certain forms of a propulsion system of the present invention the pressure of the gas stream going to the turbine 23 through exit port 45 is higher than the pressure of the working fluid at the compressor discharge 25. Therefore, the requirement for higher pressure cooling fluid can be met by taking a portion of the high pressure buffer gas exiting port 44 and delivering to the appropriate location(s) within the turbine. With reference to FIG. 1a, there is illustrated the delivery of the high pressure buffer gas exiting through outlet port 44 and being delivered through passageway 510 to the turbine.

Wave rotor outlet ports 44 and 45 form the outlet port sequence, and multiple outlet port sequences can be integrated into a waver rotor device. In one preferred embodiment there are two outlet port sequences disposed along the circumference of the wave rotor device. The inlet port sequence and the outlet port sequence are combined with the rotatable rotor to form a pulsed combustion wave rotor engine. Routing of the compressed buffer gas from the buffer gas outlet port 44 into the wave rotor passageways 41 via port 43 provides for: high pressure flow issuing generally uniformly from the to-turbine outlet port 45; and/or, a cooling effect delivered rapidly and in a prolonged fashion to the rotor walls defining the rotor passageways 41 following the combustion process; and/or, a reduction and smoothing of pressure in the inlet port 42 thereby aiding in the rapid and substantially uniform drawing in of working fluid from the compressor 21.

Combusted gasses exiting through the to-turbine outlet port 45 pass to the turbine 23 where shaft power is produced to power the compressor 21. Additional power may be produced to be used in the form of output shaft power. Further, combusted gas leaves the turbine 23 and enters the nozzle 32 where thrust is produced. The construction and details related to the utilization of a nozzle to produce thrust will not be described herein as it is believed known to one of ordinary skill in the art of engine design.

Referring to FIG. 2, there is illustrated a partially exploded view of one embodiment of the wave rotor device 22. Wave rotor device 22 comprises a rotor 40 that is rotatable about a centerline X and passes a plurality of fluid passageways 41 by a plurality of inlet ports 42, 43 and outlet ports 44, 45 that are formed in end plates 46 and 47. Preferably, the rotor is cylindrical, however other geometric shapes are contemplated herein. In one embodiment the end plates 46 and 47 are coupled to stationary ducted passages between the compressor 21 and the turbine 23. The pluralities of fluid passageways 41 are positioned about the circumference of the wave rotor device 22.

In one form the rotation of the rotor 40 is accomplished through a conventional rotational device. In another form the gas turbine 23 can be used as the means to cause rotation of the wave rotor 40. In another embodiment the wave rotor is a self-turning, freewheeling design; wherein freewheeling indicates no independent drive means are required. In one form the freewheeling design is contemplated with angling and/or curving of the rotor passageways. In another form the freewheeling design is contemplated to be driven by the angling of the inlet duct 42a so as to allow the incoming fluid flow to impart angular momentum to the rotor 40. In yet another form the freewheeling design is contemplated to be driven by angling of the inlet duct 43a so as to allow the incoming fluid flow to impart angular momentum to the rotor. Further, it is contemplated that the inlet ducts 42a and 43a can both be angled, one of the inlet ducts is angled or neither is angled. The use of curved or angled rotor passageways within the rotor and/or by imparting momentum to the rotor through one of the inlet flow streams, the wave rotor may produce useful shaft power. This work can be used for purposes such as but not limited to, driving an upstream compressor, powering engine accessories (fuel pump, electrical power generator, engine hydraulics) and/or to provide engine output shaft power. The types of rotational devices and methods for causing rotation of the rotor 40 is not intended to be limited herein and include other methods and devices for causing rotation of the rotor 40 as occur to one of ordinary skill in the art. One form of the present invention contemplates rotational speeds of the rotor within a range of about 1,000 to about 100,000 revolutions per minute, and more preferably about 10,000 revolutions per minute. However, the present invention is not intended to be limited to these rotational speeds unless specifically stated herein.

The wave rotor/cell rotor 40 is fixedly coupled to a shaft 48 that is rotatable on a pair of bearings (not illustrated). In one form of the present invention the wave rotor/cell rotor rotates about the centerline X in the direction of arrow Z. While the present invention has been described based upon rotation in the direction of arrow Z, a system having the appropriate modifications to rotate in the opposite direction is contemplated herein. The direction Z may be concurrent with or counter to the rotational direction of the gas turbine engine rotors. In one embodiment the plurality of circumferentially spaced passageways 41 extend along the length of the wave rotor device 22 parallel to the centerline X and are formed between an outer wall member 49 and an inner wall member 50. The plurality of passageways 41 define a peripheral annulus 51 wherein adjacent passageways share a common wall member 52 that connects between the outer wall member 49 and the inner wall member 50 so as to separate the fluid flow within each of the passageways. In an alternate embodiment each of the plurality of circumferentially spaced passageways are non-parallel to the centerline, but are placed on a cone having differing radii at the opposite ends of the rotor. In another embodiment, each of the plurality of circumferentially spaced passageways are placed on a surface of smoothly varying radial placement first toward lower radius and then toward larger radius over their axial extent. In yet another embodiment, a dividing wall member divides each of the plurality of circumferentially spaced passageways, and in one form is located at a substantially mid-radial position of the passageway. In yet another embodiment, each of the plurality of circumferentially spaced passages form a helical rather than straight axial passageway.

The pair of wave rotor end plates 46 and 47 are fixedly positioned very closely adjacent the rotor 40 so as to control the passage of working fluid into and out of the plurality of passageways 41 as the rotor 40 rotates. End plates 46 and 47 are designed to be disposed in a sealing arrangement with the rotor 40 in order to minimize the leakage of fluid between the plurality of passageways 41 and the end plates. In an alternate embodiment auxiliary seals are included between the end plates and the rotor to enhance sealing efficiency. Seal types, such as but not limited to, labrynth, gland or sliding seals are contemplated herein, however the application of seals to a wave rotor is believed known to one of skill in the art.

With reference to FIG. 3, there is illustrated a space-time (wave) diagram for a pulsed detonation wave rotor engine. A pulsed detonation combustion process is a substantially constant volume combustion process. The pulsed detonation engine wave rotor described with the assistance of FIG. 3 has: the high pressure energy transfer gas outlet port 44 and the to-turbine outlet port 45 located on the same end of the device; and the high pressure energy transfer gas inlet port 43 and the from-compressor inlet port 42 on the same end of the device. In one form of the present invention there is defined a two port wave rotor cycle including one fluid flow inlet port and one fluid flow outlet port and having a high pressure buffer gas transfer recirculation loop that may be considered internal to the wave rotor device. The high pressure energy transfer inlet port 43 is prior to and adjacent the from-compressor inlet port 42. Arrow Q indicates the direction of rotation of the rotor 40. It can be observed that upon the rotation of rotor 40, each of the plurality of passageways 41 are sequentially brought into registration with the inlet ports 42, 43 and the outlet ports 44, 45 and the path of a typical charge of fluid is along the respective passageway 41. The wave diagram for the purpose of description may be started at any point, however for convenience the description is started at 60 wherein the low-pressure working fluid is admitted from the compressor. The concept of low pressure should not be understood in an absolute manner, it is only low in comparison with the rest of the pressure levels of gas within the pulsed detonation engine wave rotor.

The low-pressure portion 60 of the wave rotor engine receives a supply of low-pressure working fluid from compressor 21. The working fluid enters passageways 41 upon the from-compressor inlet port 42 being aligned with the respective passageways 41. In one embodiment fuel is introduced into the low-pressure portion 60 by: stationary continuously operated spray nozzles (liquid) 61 or supply tubes (gas) 61 located within the inlet duct 42*a* leading to the from-compressor inlet port 42; or, into region 62 by intermittently actuated spray nozzles (liquid) 61" or supply tubes (gas) 61' located within the rotor; or, into region 62 by spray nozzles (liquid) 61" or supply tubes (gas) 61" located within the rotor endplate 46. Separating region 60 and 62 is a pressure wave 73 originating from the closure of the to-turbine outlet port 45. In this way, a region 62 exists at one end of the rotor and the region has a fuel content such that the mixture of fuel and working fluid is combustable. The fuel air mixture in one end of the rotor, regions 60 and 62, is thus separated from hot residual combustion gas within regions 68 and 69 by the buffer gas entering the rotor through port 43 and traveling through regions 70, 71, 72 and 64. In this way undesirable pre-ignition of the fuel air mixture of regions 60 and 62 is inhibited.

A detonation is initiated from an end portion of the rotor 40 adjacent the region 62 and a detonation wave 63 travels through the fuel air mixture within the region 62 toward the opposite end of the rotor containing a working-fluid-without-fuel region 64. In one form of the present invention the detonation is initiated by a detonation initiator 80 such as but not limited to a high energy spark discharge device. However, in an alternate form of the present invention the detonation is initiated as an auto-detonation process and does not include a detonation initiator. The detonation wave 63 travels along the length of the passageway and ceases with the absence of fuel at the gas interface 65. Thereafter, a pressure wave 66 travels into the working-fluid-without-fuel region 64 of the passageway and compresses this working fluid to define a high-pressure buffer/energy transfer gas within region 67. The concept of high pressure should not be understood in an absolute manner, it is only high in comparison with the rest of the pressure level of gas within the pulsed detonation engine wave rotor.

In one embodiment the high pressure buffer/energy transfer gas is a non-vitiated working fluid. In another embodiment the high pressure buffer/energy transfer gas is comprised of working fluid having experienced the combustion of fuel (vitiated) regardless of what other compression or expansion process have taken place after the combustion. Working fluid of this type would generally be characterized as having a portion of the oxygen depleted, the products of combustion present and the associated entropy increase remaining relative to the non-combusted working fluid starting from the same initial state and undergoing the same post combustion processes. An incomplete mixing can take place between the vitiated and non-vitiated gas portions adjoining each other in the passageway and thus realize a mixture of the two which thus comprises the high pressure buffer/energy transfer gas.

The high pressure buffer/energy transfer gas within region 67 exits the wave rotor device 22 through the buffer gas outlet port 44. The combustion gases within the region 68 exit the wave rotor through the to-turbine outlet port 45. Expansion of the combusted gas prior to entering the turbine results in a lower turbine inlet temperature without reducing the effective peak cycle temperature. As the combusted gas exits the outlet port 45, the expansion process continues within the passageway 41 of the rotor and travels toward the opposite end of the passageway. As the expansion arrives at the end of the passage, the pressure of the gas within the region 69 at the end of the rotor opposite the to-turbine outlet port 45 declines. The wave rotor inlet port 43 opens and allows the flow of the high pressure buffer/energy transfer working fluid into the rotor at region 70 and causes the recompression of a portion of the combustion gases within the rotor. In one embodiment, the admission of gas via port 43 can be accomplished by a shock wave. However, in another embodiment the admission is accomplished without a shock wave. The flow of the high pressure buffer gas adds energy to the exhaust process of the combustion gas and allows the expansion of the combusted gas to be accomplished in a controlled uniform energy process in one form of the invention. Thus, in one form the introduction of the high pressure buffer/energy transfer gas is adapted to maintain the high velocity flow of combusted gases exiting the wave rotor until substantially all of the combusted gas within the rotor is exhausted.

In one embodiment, the wave rotor inlet port 43, which allows the introduction of the high-pressure buffer/energy transfer gas, closes before the to-turbine outlet port 45 is closed. The closing of the wave rotor inlet port 43 causes an expansion process to occur within the high pressure buffer/energy transfer air within region 71 and lowers the pressure of the gas and creates a region 72. Following the creation of this lowered pressure gas region 72, a passageway 41 is in registration with port 42 and gas flowing within port 42 enters the passageway 41 creating region 60. The strong and compact nature of the expansion process in region 71 causes a beneficially large pressure difference between the pressure in port 45 and the pressure in port 42. In one embodiment the pressure of the gas delivered to the turbine 23 is higher than the pressure delivered from the compressor 21 and hence the power output of the engine enhanced and/or the quantity of fuel required to generate power in the turbine is reduced. The term enhanced and reduced are in reference to an engine utilizing a combustion device of common practice, having constant or lowering pressure, located between the compressor and turbine in the place of the present invention. The expansion process 71 occurs within the buffer/energy transfer gas and allows substantially all of the combustion gases of region 68 to exit the rotor leaving the lowest pressure region of the rotor consisting essentially of expanded buffer/energy transfer gas. The to-turbine outlet port 45 is closed as the expansion in region 71 reaches the exit end of the passageway. In one form of the present invention as illustrated in region 75 a portion of the high-pressure buffer/energy transfer gas exits through the outlet port 45. This gas acts to insulate the duct walls 45a from the hot combusted gas within region 74 of the duct 45b. In an alternate embodiment the high pressure buffer/energy transfer gas is not directed to insulate and cool the duct walls 45a. The pressure in region 72 has been lowered, and the from-compressor inlet port 42 allows pre-compressed low-pressure air to enter the rotor passageway in the region 60 having the lowered pressure. The entering motion of the precompressed low-pressure air through port 42 is stopped by the arrival of a pressure wave 73 originating from the exit end of the rotor and traveling toward the inlet end. The pressure wave 73 originated from the closure of the to-turbine outlet port 45. The design and construction of the wave rotor is such that the arrival of pressure wave 73 corresponds with the closing of the from-compressor inlet port 42.

Figure 4:
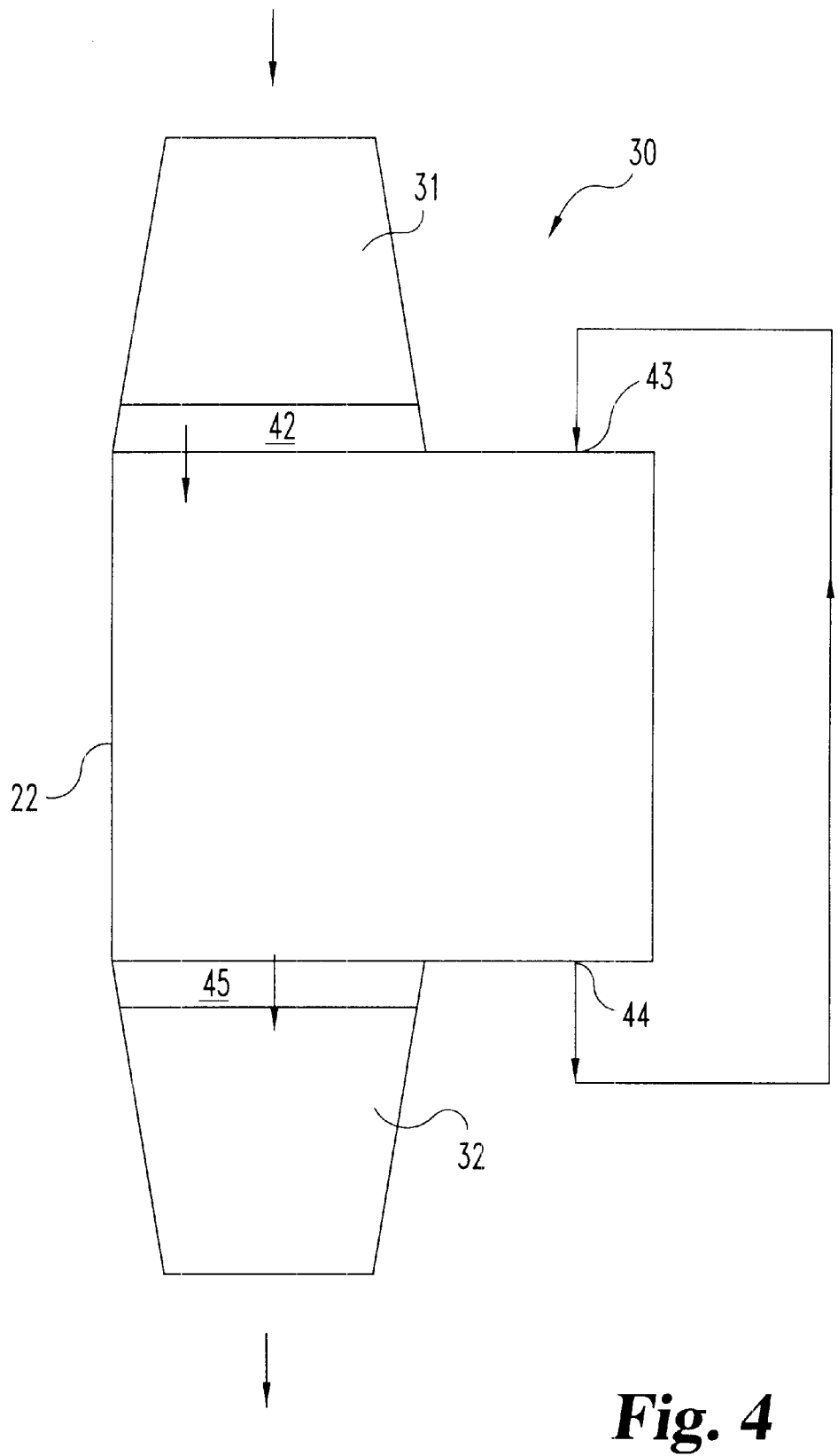
FIG. 4 is a schematic representation of a pulsed combustion engine wave rotor intended to be used as a direct thrust-producing propulsion system without conventional turbomachinery components.

With reference to FIG. 4, there is illustrated schematically an alternate embodiment of a propulsion system 30. In one embodiment the propulsion system 30 includes a fluid inlet 31, a pulsed combustion detonation engine wave rotor 22 and nozzle 32. The wave rotor device 22 is identical to the wave rotor described in propulsion system 20 and like feature number will be utilized to describe like features. In one form propulsion system 30 is adapted to produce thrust without incorporation of conventional turbomachinery components. In one embodiment the combustion gases exiting the wave rotor are directed through the nozzle 32 to produce motive power. The working fluid passing through inlet 31 is conveyed through the first wave rotor inlet port 42 and into the wave rotor device 22. High pressure buffer gas is discharged through wave rotor outlet port 44 and passes back into the wave rotor device through wave rotor inlet port 43. The relatively high energy flow of combusted gases flows out of outlet port 45 and exits nozzle 32.

Figure 5:
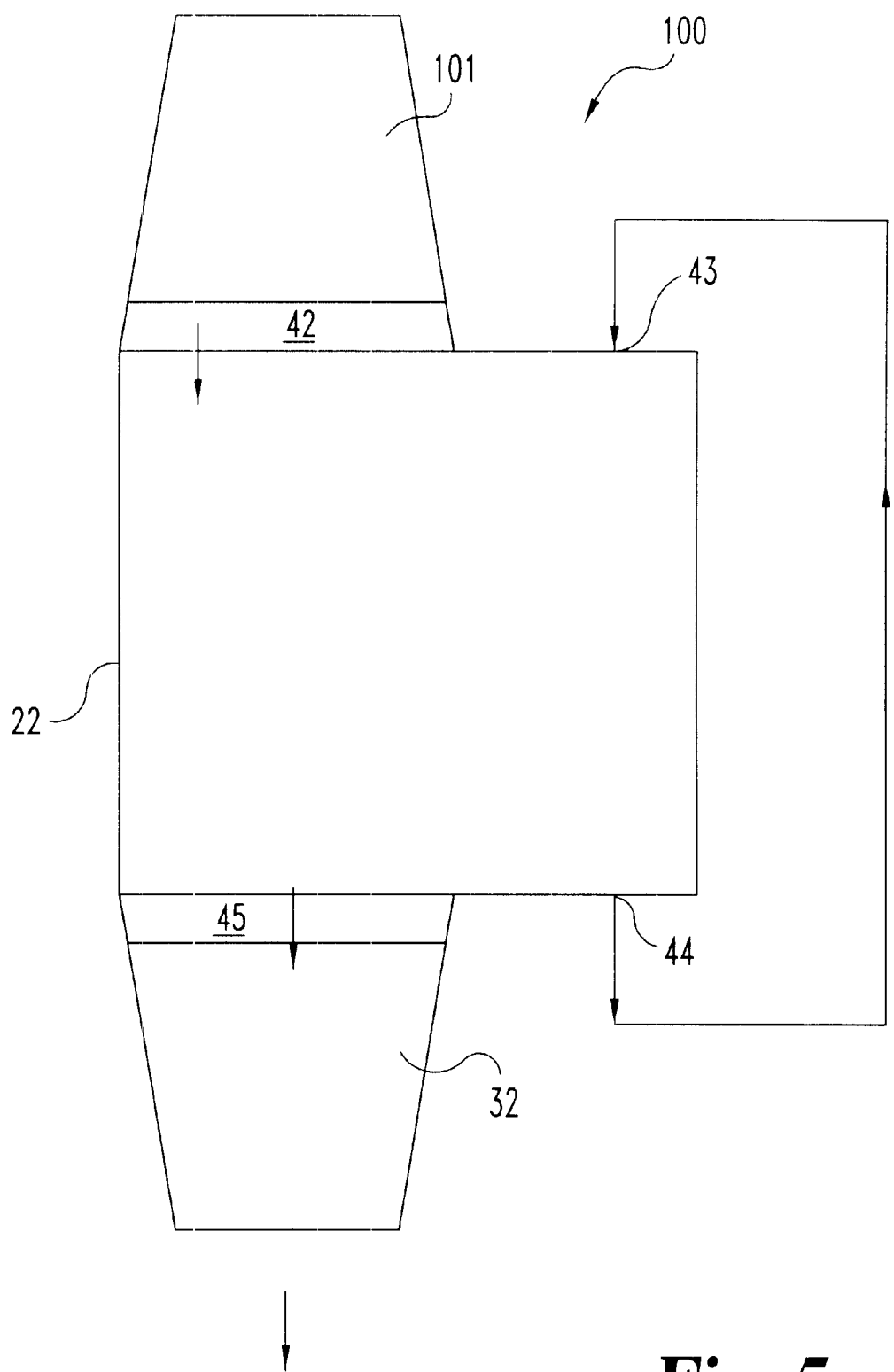
FIG. 5 is a schematic representation of another embodiment of a pulsed combustion engine wave rotor intended to be used as a direct thrust-producing propulsion system without conventional turbomachinery components.

With reference to FIG. 5, there is illustrated schematically an alternate embodiment of a rocket type propulsion system 100. In one embodiment, the propulsion system 100 includes an oxidizer and working gas storage tank 101, a pulsed combustion detonation engine wave rotor 22 and nozzle 32. The wave rotor device 22 is identical to the wave rotor device discussed previously for propulsion system 20 and like feature numbers will be utilized to describe like features. In one form propulsion system 100 is adapted to produce thrust without incorporation of conventional turbomachinery components. The first wave rotor inlet port 42 is in fluid communication with the oxidizer and working gas storage tank 100 and receives a quantity of working fluid therefrom. High pressure buffer gas is discharged through the wave rotor outlet port 44 and passes back into the wave rotor device through wave rotor inlet port 43. The relatively high energy flow of combusted gases pass out of the outlet port 45 and exits nozzle 32 to produce motive power.

A few additional alternate embodiments (not illustrated) contemplated herein will be described in comparison to the embodiment of FIG. 4. The use of like feature numbers is intended to represent like features. One of the alternate embodiments is a propulsion system including a turbomachine type compressor placed immediately ahead of the wave rotor 22 and adapted to supply a compressed fluid to inlet 42. The turbomachine type compressor is driven by shaft power derived from the wave rotor 22. Another of the alternate embodiments includes a conventional turbine placed downstream of the wave rotor 22 and adapted to be supplied with the gas exiting port 45. The second type of alternate embodiment does not include a nozzle and delivers only engine output shaft power. A third embodiment contemplated herein is similar to the embodiment of FIG. 1, but the nozzle 32 has been removed and is utilized for delivering output shaft power. The prior list of alternate embodiments is not intended to be limiting to the types of alternate embodiments contemplated herein.

Figure 6:
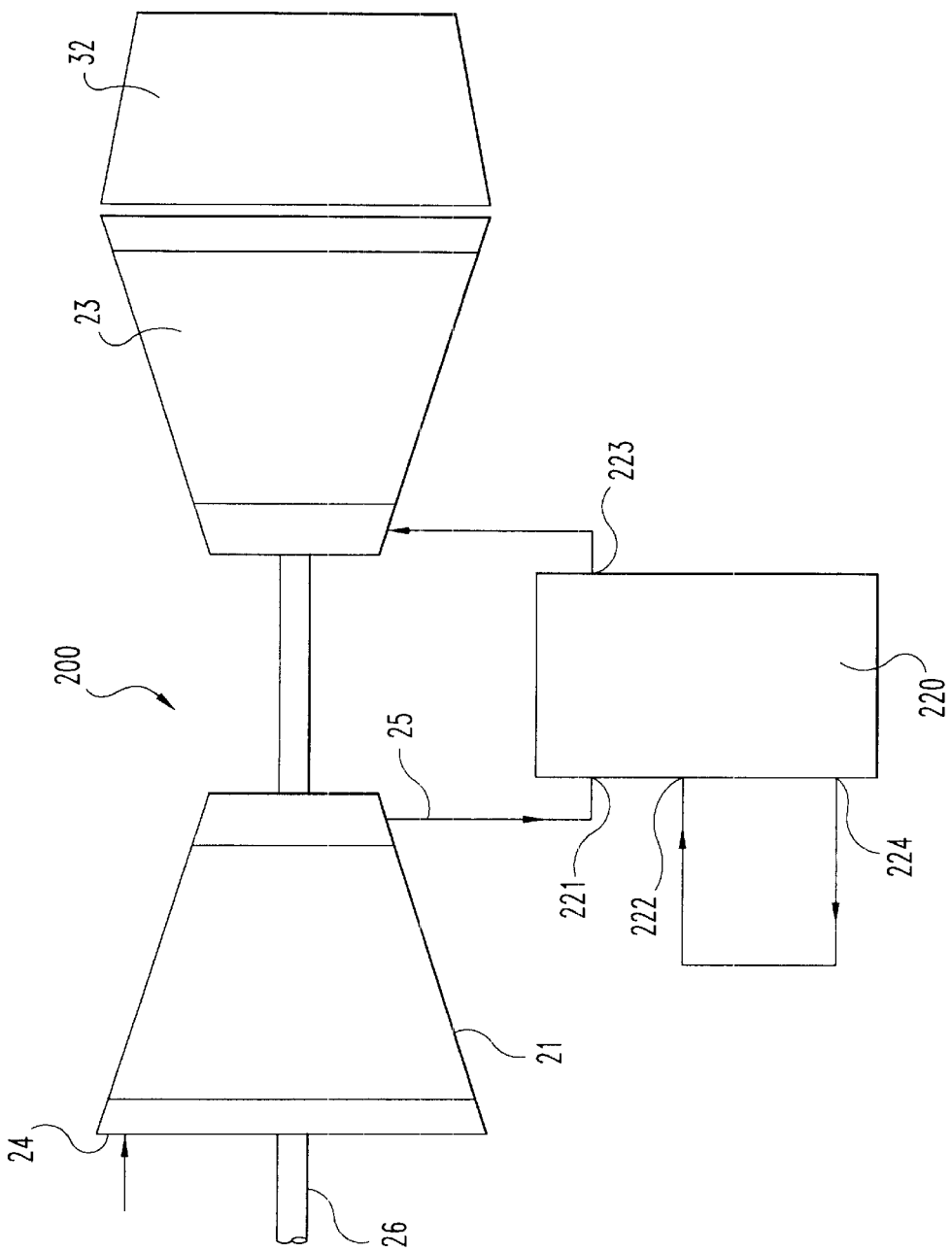
FIG. 6 is a schematic representation of an alternate embodiment of a propulsion system comprising a compressor, a pulsed combustion engine wave rotor, a turbine, a nozzle and an output power shaft.

With reference to FIG. 6, there is illustrated a schematic representation of an alternate embodiment of propulsion system 200 which includes compressor 21, a pulsed combustion wave rotor 220, a turbine 23, a nozzle 32 and an output power shaft 26. The propulsion system 200 is substantially similar to the propulsion system 20 and like features numbers will be utilized to describe like elements. More specifically, the propulsion system 200 is substantially similar to the propulsion system 20 and the details relating to system 200 will focus on the alternative pulsed detonation engine wave rotor 220.

Figure 7:
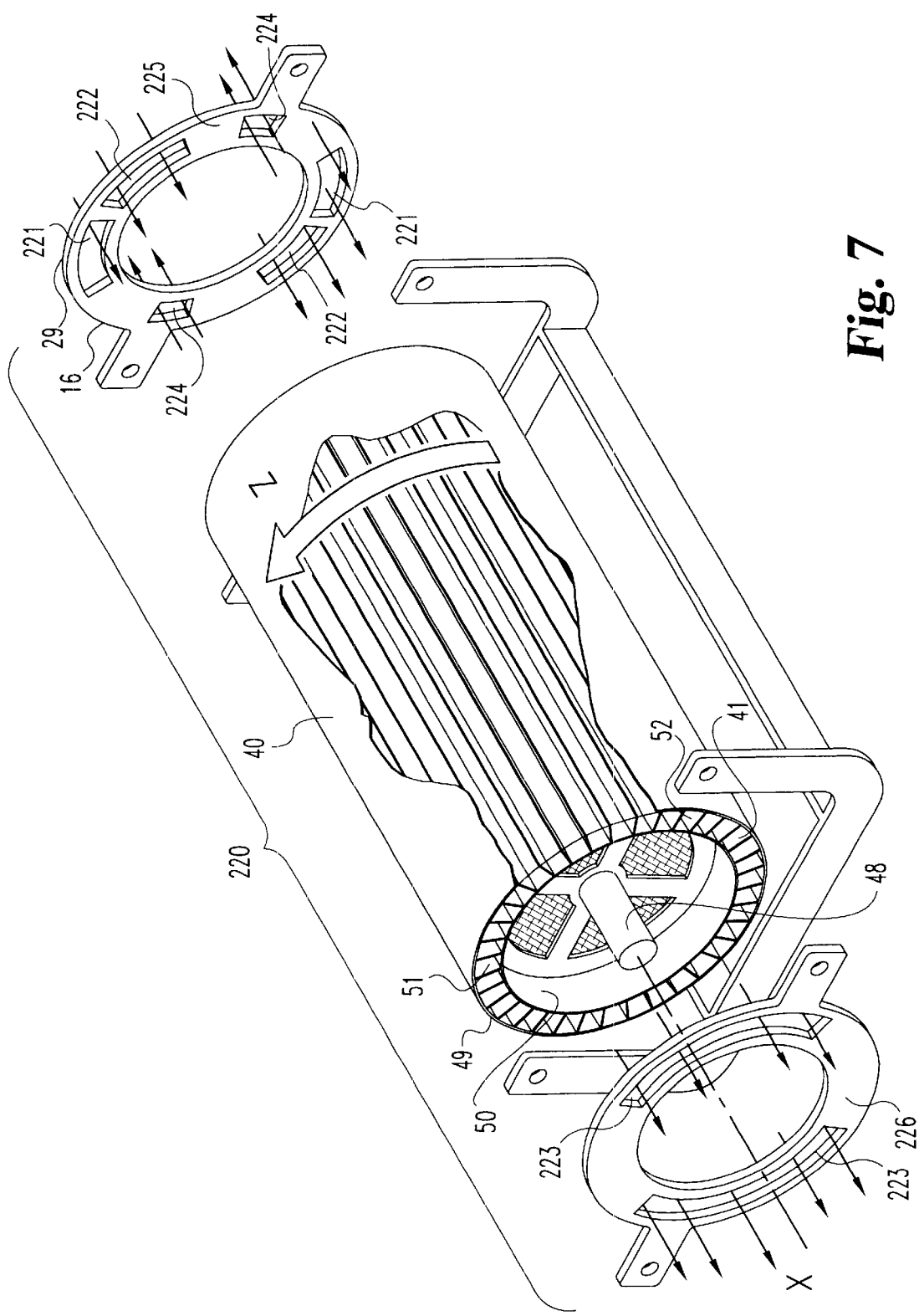
FIG. 7 is a partially exploded view of one embodiment of a pulsed combustion engine wave rotor comprising a portion of FIG. 6.
Figure 8:
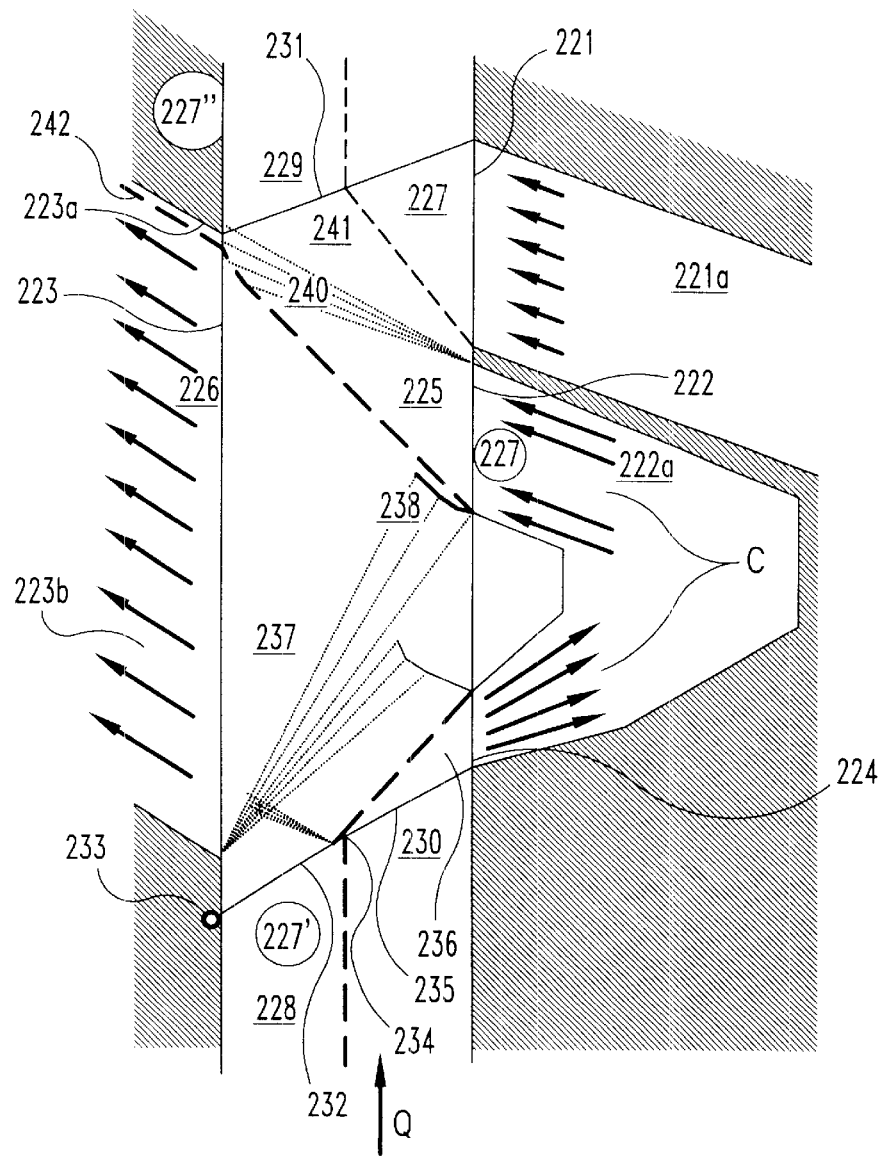
FIG. 8 is a space-time (wave) diagram for an alternate embodiment of a pulsed detonation engine wave rotor wherein the high-pressure energy transfer gas outlet port and the combustion gas exit port are on opposite ends of the device.

With reference to FIGS. 6–8, further aspects of the propulsion system 200 will be described. As discussed previously, a substantial portion of the propulsion system 200 is identical to the propulsion system 20 and this information will not be repeated as it has been set forth previously. A pressurized working fluid passes through the compressor outlet 25 and is delivered to a first wave rotor inlet port 221. A second wave rotor inlet port 222 is referred to as a buffer gas inlet port, and is located adjacent to and sequentially prior to the first wave rotor inlet port 221. Wave rotor inlet ports 221 and 222 form an inlet port sequence, and multiple inlet port sequences can be integrated into a wave rotor device. In one preferred embodiment there are two inlet port sequences disposed along the circumference of the wave rotor device 220.

Wave rotor device 220 has an outlet port sequence that includes an outlet port 223 and a buffer gas outlet port 224. In one embodiment of propulsion system 200 the outlet port 223 is defined as a to-turbine outlet port 223. The to-turbine outlet port 223 of propulsion system 200 allows the combusted gases to exit the wave rotor device 220 and pass to the turbine 223. Compressed buffer gas exits the buffer gas outlet port 224 and is reintroduced into the rotor passageways 41 through the second wave rotor inlet port 222. In one embodiment, the buffer gas outlet port 224 and the second wave rotor inlet port 222 are connected in fluid communication by a duct. In a further alternate embodiment, the duct functions as a high pressure buffer gas reservoir and/or is connected to an auxiliary reservoir which is designed and constructed to hold a quantity of high pressure buffer gas. This reintroduced buffer gas does work on the remaining combusted gases within the rotor passageways 41 and causes the pressure in region 225 to remain at an elevated level. The relatively high energy flow of combusted gases from the to-turbine port 223 is maintained in region 226 by the reintroduction of the high pressure buffer gas entering through the second wave rotor inlet port 222. The flow of the high pressure buffer gas from buffer gas outlet port 224 to the second wave rotor inlet port 222 is illustrated schematically by arrows C in FIG. 8.

Figure 6A:
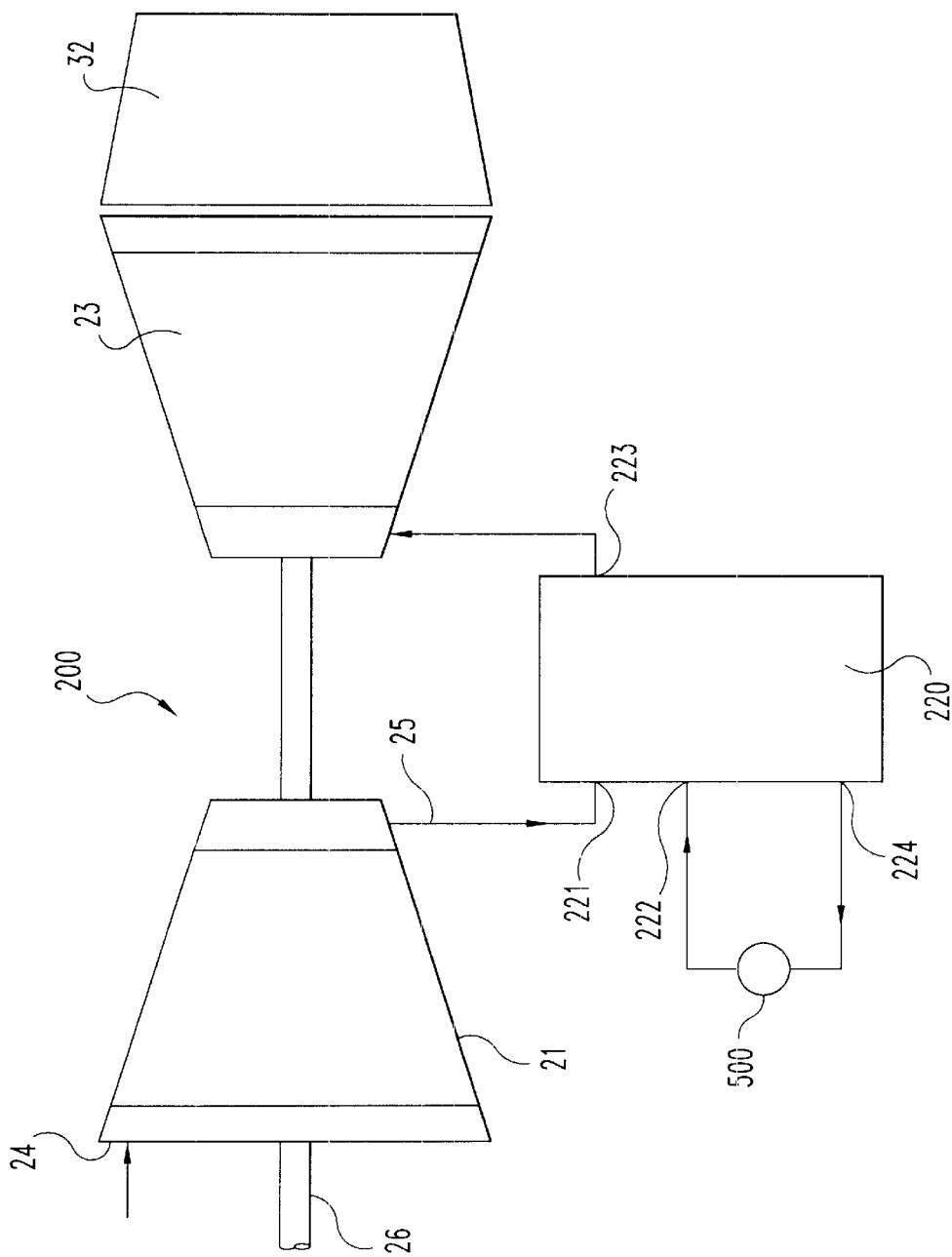
FIG. 6a is a schematic representation of another embodiment of a propulsion system comprising a compressor, a pulsed combustion engine wave rotor, a turbine, a nozzle and an output power shaft.

Wave rotor device 220 has an outlet port sequence that includes an outlet port 223 and a buffer gas outlet port 224. In one embodiment of propulsion system 200 the outlet port 223 is defined as a to-turbine outlet port 223. The to-turbine outlet port 223 of propulsion system 200 allows the combusted gases to exit the wave rotor device 220 and pass to the turbine 223. Compressed buffer gas exits the buffer gas outlet port 224 and is reintroduced into the rotor passageways 41 through the second wave rotor inlet port 222. In one embodiment, the buffer gas outlet port 224 and the second wave rotor inlet port 222 are connected in fluid communication by a duct. In a further alternate embodiment, the duct functions as a high pressure buffer gas reservoir and/or is connected to an auxiliary reservoir which is designed and constructed to hold a quantity of high pressure buffer gas. With reference to FIG. 6a, there is illustrated an auxiliary reservoir 500 for receiving a quantity of the high pressure buffer gas. This reintroduced buffer gas does work on the remaining combusted gases within the rotor passageways 41 and causes the pressure in region 225 to remain at an elevated level. The relatively high energy flow of combusted gases from the to-turbine port 223 is maintained in region 226 by the reintroduction of the high pressure buffer gas entering through the second wave rotor inlet port 222. The flow of the high pressure buffer gas from buffer gas outlet port 224 to the second wave rotor inlet port 222 is illustrated schematically by arrows C in FIG. 8.

Referring to FIG. 7, there is illustrated a partially exploded view of one embodiment of the wave rotor device 220. Wave rotor 220 comprises a cylindrical rotor 40 that is rotatable about a centerline X and passes a plurality of fluid passageways 41 by a plurality of ports 221, 222 and 224 formed in end plate 225 and outlet ports 223 formed in end plate 226. In one embodiment, the end plates 225 and 226 are coupled to stationary ducted passages between the compressor 21 and the turbine 23. The plurality of fluid passageways 41 is positioned about the circumference of the wave rotor device 220.

In one form a conventional rotational device accomplishes the rotation of rotor 40. In another form the gas turbine 23 can be used as the means to cause rotation of the wave rotor 40. In another embodiment the wave rotor is a self-turning, freewheeling design; wherein freewheeling indicates no independent drive means are required. In one form, the freewheeling design is contemplated with angling and/or curving of the rotor passageways. In another form, the freewheeling design is contemplated to be driven by the angling of the inlet duct 221a so as to allow the incoming fluid flow to impart angular momentum to the rotor 40. In yet another form, the free-wheeling design is contemplated to be driven by angling of the inlet duct 222a so as to allow the incoming fluid flow to impart angular momentum to the rotor. Further, it is contemplated that the inlet ducts 222a and 221a can both be angled, one of the inlet ducts is angled or neither is angled. The use of curved or angled rotor passageways within the rotor and/or by imparting of momentum to the rotor through one of the inlet flow streams, the wave rotor may produce useful shaft power.

The wave rotor/cell rotor 40 is fixedly coupled to a shaft 48 that is rotatable on a pair of bearings (not illustrated). In one form of the present invention, the wave rotor/cell rotor rotates about the center line X in the direction of arrows Z. While the present invention has been described based upon rotation in the direction of arrow Z, a system having the appropriate modifications to rotate in the opposite direction is contemplated herein. The direction Z may be concurrent with or counter to the rotational direction of the gas turbine engine rotors. In one embodiment the plurality of circumferentially spaced passageways 41 extend along the length of the wave rotor device 220 parallel to the center line X and are formed between the outer wall member 49 and an inner wall member 50. The plurality of passageways 41 define a peripheral annulus 51 wherein adjacent passageways share a common wall member 52 that connects between the outer wall member 49 and the inner wall 50 so as to separate the fluid flow within each of the passageways. In an alternate embodiment each of the plurality of circumferentially spaced passageways are non-parallel to the center line, but are placed on a cone having different radii at the opposite ends of the rotor. In another embodiment, a dividing wall member divides each of the plurality of circumferentially spaced passageways, and in one form is located at a substantially mid-radial position. In yet another embodiment, each of the plurality of circumferentially spaced passageways form a helical rather than straight passageway. Further, in another embodiment, each of the plurality of circumferentially spaced passageways are placed on a surface of smoothly varying radial placement first toward lower radius and then toward larger radius over their axial extent.

The pair of wave rotor end plates 225 and 226 are fixedly positioned very closely adjacent to rotor 40 so as to control the passage of working fluid into and out of the plurality of passageways 41 as the rotor 40 rotates. End plates 225 and 226 are designed to be disposed in a sealing arrangement with the rotor 40 in order to minimize the leakage of fluid between the plurality of passageways 41 and the end plates. In an alternate embodiment, auxiliary seals are included between the end plates and the rotor to enhance sealing efficiency. Seal types, such as but not limited to, labrynth, gland or sliding seals are contemplated herein, however, the application of seals to a wave rotor is believed known to one of skill in the art.

With reference to FIG. 8, there is illustrated a space-time (wave) diagram for a pulsed detonation wave rotor engine. The pulsed detonation engine wave rotor described with the assistance of FIG. 8 has: the high pressure energy transfer gas outlet port 224, the high pressure energy transfer gas inlet port 222 and the from-compressor inlet port 221 on the same end of the device; and the to-turbine outlet port 223 located on the opposite end of the device. In one form of the present invention there is defined a two port wave rotor cycle including one fluid flow inlet port and one fluid flow outlet port and having a high pressure buffer gas recirculation loop that may be considered internal to the wave rotor device. The high pressure energy transfer inlet port 222 is prior to and adjacent the from-compressor inlet port 221. It can be observed that upon the rotation of rotor 40 each of the plurality of passageways 41 are sequentially brought in registration with the inlet ports 221 and 222 and the outlet ports 223 and 224, and the path of a typical charge of fluid is along the respective passageways 41. The wave diagram for the purpose of description may be started at any point, however, for convenience, the description is started at 227 wherein the low-pressure working fluid is admitted from the compressor. The concept of low pressure should not be understood in absolute manner, it is only low in comparison with the rest of the pressure level of gas within the pulsed detonation engine wave rotor.

The low pressure portion 227 of the wave rotor engine receives a supply of low-pressure working fluid from compressor 21. The working fluid enters passageways 41 upon the from-compressor inlet port 221 being aligned with the respective passageways 41. In one embodiment fuel is introduced into the region 225 by: stationery continuously operated spray nozzles (liquid) 227 or supply tubes (gas) 227 located within the duct 222a leading to the high pressure energy transfer gas inlet port 222; or, into region 228 by intermittently actuated spray nozzles (liquid) 227' or supply tubes (gas) 227' located within the rotor; or, into region 228 by spray nozzles (liquid) 227" or supply tubes (gas) 227" located within the rotor end plate 226. Region 228 exists at the end of the rotor and the region has a fuel content such that the mixture of fuel and working fluid is combustable.

A detonation is initiated from an end portion of the wave rotor 40 adjacent the region 228 and a detonation wave 232 travels through the fuel-working-fluid air mixture within the region 228 toward the opposite end of the rotor containing a working-fluid-without-fuel region 230. In one form of the present invention, the detonation is initiated by a detonation initiator 233, such as but not limited to a high energy spark discharge device. However, in an alternate form of the present invention the detonation is initiated by an auto-detonation process and does not include a detonation initiator. The detonation wave 232 travels along the length of the passageway and ceases with the absence of fuel at the gas interface 234. Thereafter, a pressure wave 235 travels into the working-fluid-without-fuel region 230 of the passageway and compresses this working fluid to define a high-pressure buffer/energy transfer gas within region 236. The concept of high pressure should not be understood in an absolute manner, it is only high in comparison with the rest of the pressure level of gas within the pulsed detonation engine wave rotor.

The high pressure buffer/energy transfer gas within region 236 exits the wave rotor device 220 through the buffer gas outlet port 224. The combusted gases within the region 237 exits the wave rotor through the to-turbine outlet port 223. Expansion of the combusted gas prior to entering the turbine results in a lower turbine inlet temperature without reducing the effective peak cycle temperature. As the combusted gas exits the outlet port 223, the expansion process continues within the passageways 41 of the rotor and travels toward the opposite end of the passageway. As the expansion arrives at the end of the passage, the pressure of the gas within the region 238 at the end of the rotor opposite the to-turbine outlet port 223 declines. The wave rotor inlet port 222 opens and allows the flow of the high pressure buffer/energy transfer working fluid into the rotor at region 225 and causes the recompression of a portion of the combusted gases within the rotor. The admission of gas via port 222 can be accomplished by a shock wave. The flow of the high pressure buffer gas adds energy to the exhaust process of the combustion gas and allows the expansion of the combusted gas to be accomplished in a controlled, uniform energy process in one form of the invention. Thus, in one form the introduction of the high pressure buffer/energy transfer gas is adapted to maintain the high velocity flow of combusted gases exiting the wave rotor until substantially all of the combusted gas within the rotor is exhausted.

In one embodiment, the wave rotor inlet port 222, which allows the introduction of the high pressure buffer/energy transfer gas, closes before the to-turbine outlet port 223 is closed. The closing of the wave rotor inlet port 222 causes an expansion process to occur within the high pressure buffer/energy transfer air within region 240 and lowers the pressure of the gas and creates a region 241. This expansion process occurs within the buffer/energy transfer gas and allows this gas to preferentially remain within the rotor at the lowest pressure region of the rotor. The to-turbine outlet port 223 is closed as the expansion in region 240 reaches the exit end of the passageway. In one form of the present invention as illustrated in region 242, a portion of the high pressure buffer/energy transfer gas exits through the outlet port 223. This exiting buffer/energy transfer gas functions to insulate the duct wall 223a from the hot combusted gas within region 226 of the duct 223b. The pressure in region 241 has been lowered and the from-compressor inlet port 221 allows pre-compressed low pressure working fluid to enter the rotor passageways in the region 227 having the lowered pressure. The entering motion of the pre-compressed low-pressure working fluid through port 221 is stopped by the arrival of pressure wave 231 originating from the exit end of the rotor and traveling toward the inlet end. The pressure wave 231 originated from the closure of the to-turbine outlet port 223. The design and construction of the wave rotor is such that the arrival of the pressure wave 231 corresponds with the closing of the from-compressor inlet port 221.

Figure 9:
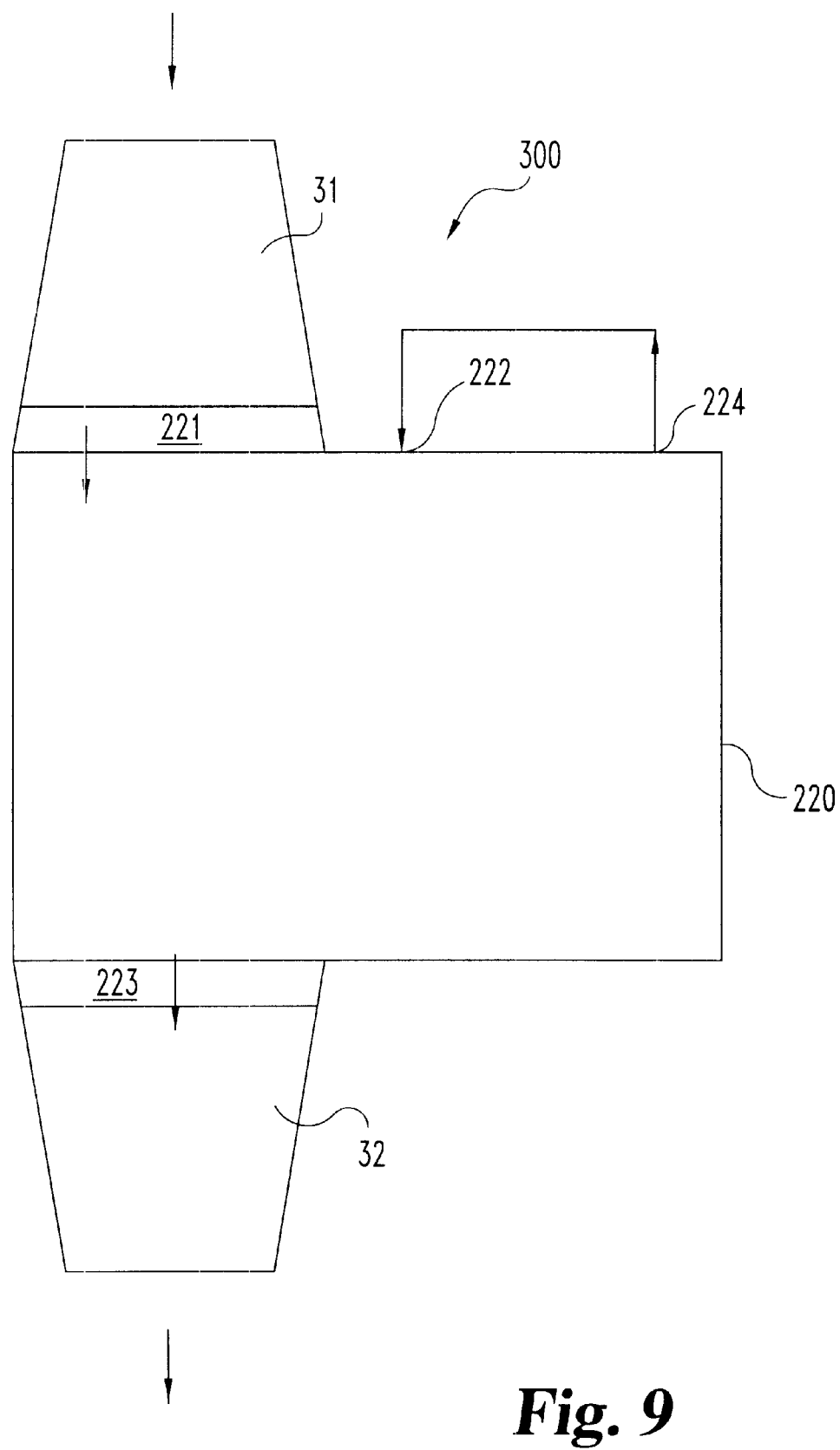
FIG. 9 is a schematic representation of a pulsed combustion engine wave rotor intended to be used as a direct thrust-producing propulsion system without conventional turbomachinery components.

With reference to FIG. 9, there is illustrated schematically an alternate embodiment of a propulsion system 300. In one embodiment the propulsion system 300 includes a fluid inlet 31, a pulsed combustion detonation engine wave rotor 220 and a nozzle 32. The wave rotor device 220 is identical to the wave rotor described in propulsion system 200 and like feature numbers will be utilized to indicate like features. In one form propulsion system 30 is adapted to produce thrust without incorporation of conventional turbomachinery components. The working fluid passing through the inlet 31 is conveyed through the first wave rotor inlet port 221 and into the wave rotor 220. High pressure buffer gas is discharged through wave rotor outlet port 224 and passes back into the wave rotor device through wave rotor inlet port 222. The relatively high energy flow of combusted gases flows out of the outlet port 223 and exits through nozzle 32 to produce motive power.

Figure 10:
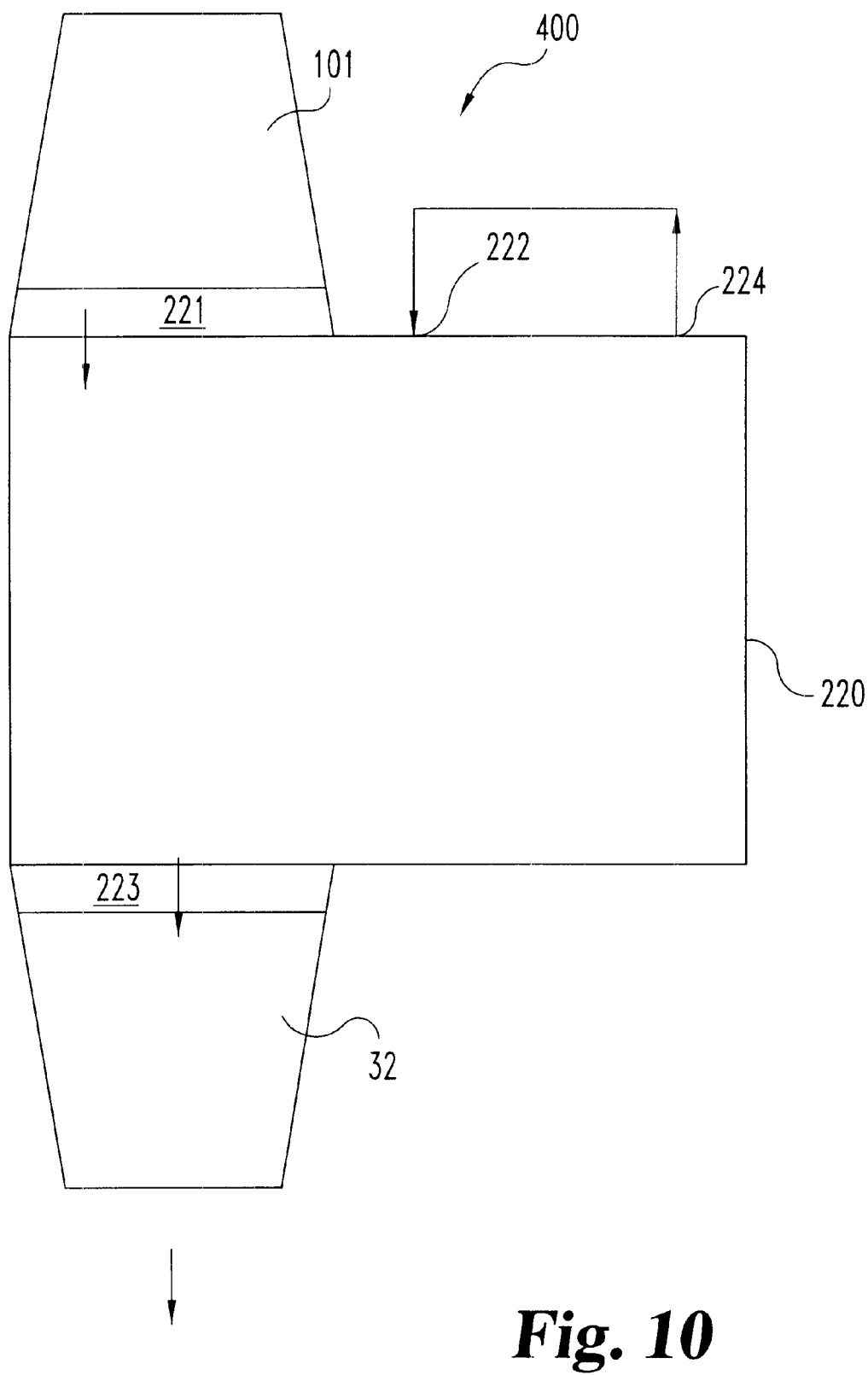
FIG. 10 is a schematic representation of another embodiment of a pulsed combustion engine wave rotor intended to be used as a direct thrust-producing propulsion system without conventional turbomachinery components.

With reference to FIG. 10, there is illustrated schematically an alternate embodiment of a rocket type propulsion system 400. In one embodiment, the propulsion system 400 includes an oxidizer and working gas storage tank 101, a pulsed combustion detonation engine wave rotor 220 and a nozzle 32. The wave rotor device 220 is identical to the wave rotor described in propulsion system 200 and like feature numbers will be utilized to indicate like features. In one form propulsion system 400 is adapted to produce thrust without incorporation of conventional turbomachinery components. The first wave rotor inlet port 221 is in fluid communication with the oxidizer and working gas storage tank 101 and receives a quantity of working fluid therefrom. High pressure buffer gas is discharged through the wave rotor outlet port 224 and passes back into the wave rotor device through wave rotor inlet port 222. The relatively high energy flow of combusted gases pass out of the outlet port 223 and exits nozzle 32 to produce motive power.

A few of the additional alternate embodiments (not illustrated) contemplated herein will be described in comparison to the embodiment of FIG. 9. The utilization of like feature numbers is intended to represent like features. One of the alternate embodiments includes a turbomachine type compressor placed immediately ahead of the wave rotor 220 and adapted to supply a compressed fluid to inlet 221. The turbomachine type compressor is driven by shaft power derived from the wave rotor 220. A second alternate embodiment includes a conventional turbine placed downstream of the wave rotor 220 and adapted to be supplied with the gas exiting port 223. The second type of alternate embodiment does not include a nozzle and delivers only engine output shaft power.

Figure 11:
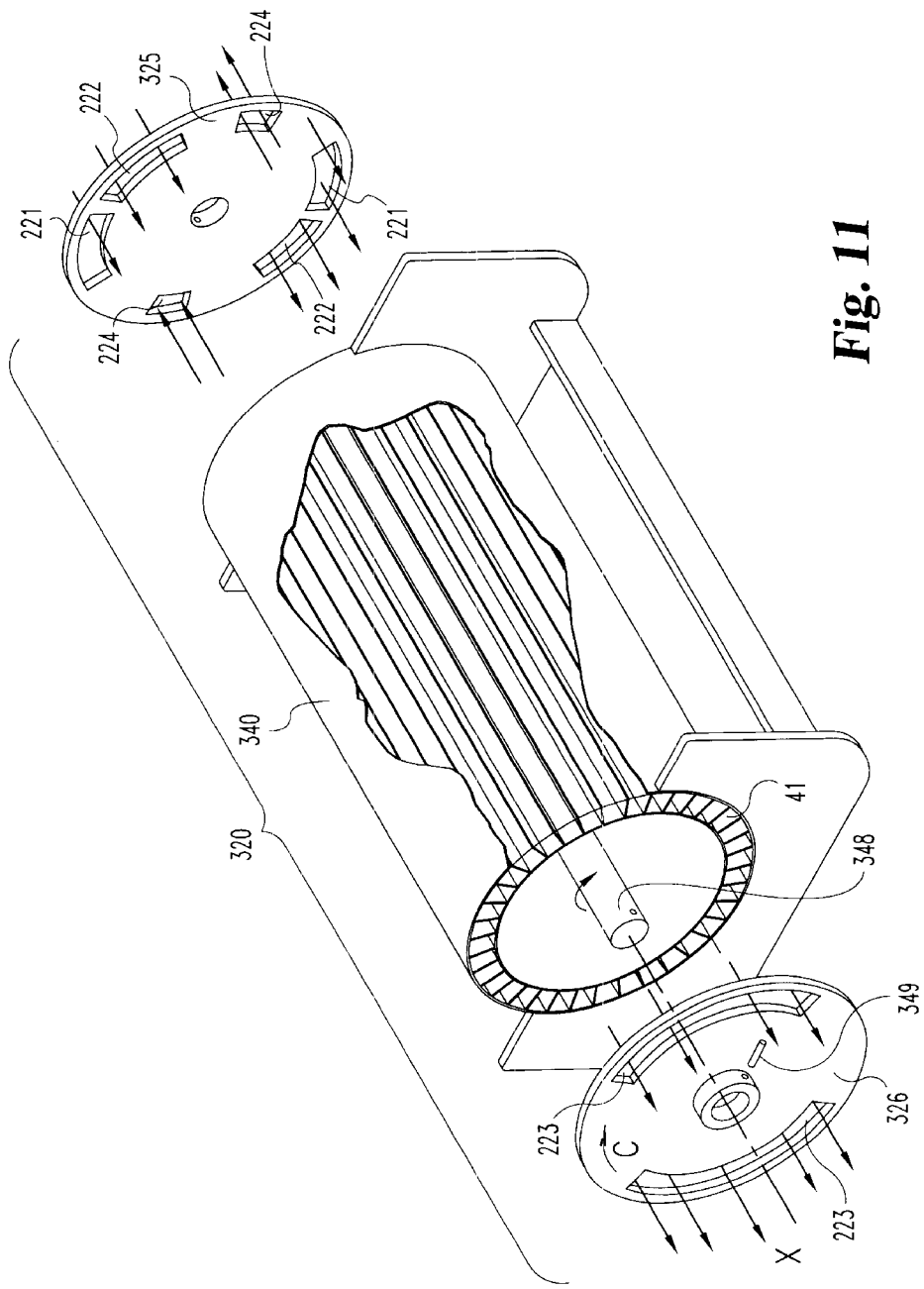
FIG. 11 is a partially exploded view of another embodiment of a pulsed combustion engine wave rotor comprising stationary fluid flow passageways between rotatable endplates having inlet and outlet ports.

The present invention is also applicable to a mechanical device wherein the plurality of fluid flow passageways are stationery, the inlet and outlet ports are rotatable, and the gas flows and processes occurring within the fluid flow passageways are substantially similar to those described previously in this document. Referring to FIG. 11, there is illustrated a partially exploded view of one embodiment of the wave rotor device 320. The description of a wave rotor device having rotatable inlet and outlet ports is not limited to the embodiment of device 320, and is applicable to other wave rotors including but not limited to the embodiments associated with FIGS. 1–5 and 9–10. The utilization of like feature numbers will be utilized to describe like features. In one form wave rotor device 320 comprises a stationary portion 340 centered about a centerline X and having a plurality of fluid passageways 41 positioned between two rotatable endplates 325 and 326. The endplates 325 and 326 are rotated to pass by the fluid passageways a plurality of inlet ports 221 and 222 and outlet ports 224 and 223. Endplates 325 and 326 are connected to shaft 348 and form a rotatable endplate assembly. In one embodiment a member 349 mechanically fixes the endplates 325 and 326 to the shaft 348. Further, the endplate assembly is rotatably supported by bearings, which are not illustrated. In one embodiment the endplates 325 and 326 are fitted adjacent to stationary ducted passages between the compressor 21 and turbine 23. Sealing between the stationary ducts and the rotating endplates is accomplished by methods and devices believed known of those skilled in the art. In a preferred form the stationary portion 340 defines a ring and the plurality of fluid passageways 41 are positioned about the circumference of the ring.

In one form a conventional rotational device is utilized to accomplish the rotation of the endplate assembly including endplates 325 and 326. In another form the gas turbine 23 can be used as the means to cause rotation of the endplates 325 and 326. In another embodiment the endplate assembly is a self-turning, freewheeling design; wherein freewheeling indicates no independent drive means are required. In one form the freewheeling design is contemplated with the use of an endplate designed so as to capture a portion of the momentum energy of the fluid exit stream of port 224 and hence provide motive force for rotation of the endplate. In another form the freewheeling design is contemplated to be driven by a portion of the momentum energy of the exit stream of port 223. In another form the freewheeling design is contemplated to be driven by a portion of the momentum energy of the inlet stream of port 222. In yet another form the freewheeling design is contemplated to be driven by a portion of the momentum energy of the inlet stream of port 221. In all cases a portion of the endplate port flowpath may contain features turning the fluid stream within one or two exit endplate port flowpaths and one or two inlet endplate port flowpaths in the tangential direction hence converting fluid momentum energy to power to rotate the endplate. The use of curved or angled passageways within the stationary portion 340 may aid in this process by imparting tangential momentum to the exit flow streams which may be captured within the endplate through turning of the fluid stream back to the axial direction. In each of these ways the rotating endplate assembly may also provide useful shaft power beyond that required to turn the endplate assembly. This work can be used for purposes such as but not limited to, driving an upstream compressor, powering engine accessories (fuel pump, electrical power generator, engine hydraulics) and/or to provide engine output shaft power. The types of rotational devices and methods for causing rotation of the endplate assembly is not intended to be limited herein and include other methods and devices for causing rotation of the endplate assembly as occur to one of ordinary skill in the art. One form of the present invention contemplates rotational speeds of the endplate assembly within a range of about 1,000 to about 100,000 revolutions per minute, and more preferably about 10,000 revolutions per minute. However, the present invention is not intended to be limited to these rotational speeds unless specifically stated herein.

The endplates 325 and 326 are fixedly coupled to the shaft 348 that is rotatable on a pair of bearings (not illustrated). In one form of the present invention the endplates rotate about the centerline X in the direction of arrow C. While the present invention has been described based upon rotation in the direction of arrow C, a system having the appropriate modifications to rotate in the opposite direction is contemplated herein. The direction C may be concurrent with or counter to the rotational direction of the gas turbine engine rotors.

The pair of rotating endplates 325 and 326 are fixedly positioned very closely adjacent the stationary portion 340 so as to control the passage of working fluid into and out of the plurality of passageways 41 as the endplates rotate. Endplates 325 and 326 are designed to be disposed in a sealing arrangement with the stationary portion 340 in order to minimize the leakage of fluid between the plurality of passageways 41 and the endplates. In an alternate embodiment auxiliary seals are included between the end plates and the rotor to enhance sealing efficiency. Seal types, such as but not limited to, labrynth, gland or sliding seals are contemplated herein, however the application of seals to a wave rotor is believed known to one of skill in the art.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention are desired to be protected.

What is claimed is:

1. A method, comprising:
   introducing a quantity of working fluid into a passageway of a wave rotor;
   placing a fuel within one end of the passageway;
   combusting the fuel within the passageway and creating a quantity of combusted gas adjacent the one end of the passageway and compressing a portion of the working fluid within the passageway to define a high pressure buffer gas adjacent the combusted gas within the passageway;
   discharging the high pressure buffer gas out of the passageway;
   discharging a first portion of the combusted gas out of the passageway; and
   routing the high pressure buffer gas from said discharging back into the passageway to purge a second portion of the combusted gas out of the passageway.

2. The method of claim 1, wherein the high pressure buffer gas is a substantially non-vitiated gas.

3. The method of claim 1, which further includes compressing the quantity of working fluid prior to said introducing.

4. The method of claim 1:
   which further includes providing at least one fluid inlet port and at least one fluid outlet port disposed adjacent to the passageway of the wave rotor; and
   which further includes rotating at least one of the passageway and the ports to control the passage of fluid into and out of the wave rotor and through the ports.

5. The method of claim 4, wherein said rotating includes independent drive means for rotating at least one of the passageway and the ports.

6. The method of claim 1, wherein the reintroduction of the buffer gas from said discharging into the passageway does work on the second portion of the combusted gas in the passageway.

7. The method of claim 1:
which further includes providing a turbine;
wherein said first portion of the combusted gas and said second portion of combusted gas purged from the passageway are routed to the turbine; and
which further includes delivering a portion of the high pressure buffer gas to the turbine to cool portions thereof.

8. The method of claim 1, which further includes flowing the high pressure buffer gas in the passageway to transfer heat from the structure defining the passageway.

9. The method of claim 4, wherein said rotating includes imparting angular momentum from the incoming fluid flow to the rotatable component.

10. The method of claim 1, wherein said combusting is initiated from one end of the passageway and a pressure wave travels along the passageway until there is an absence of fuel, and the pressure wave continues along the passageway into the working fluid without fuel to compress the portion of the working fluid to define the high pressure buffer gas.

11. The method of claim 1, which further includes routing a portion of the high pressure buffer gas to cool a structure adapted to receive the combusted gas exiting the passageway.

12. The method of claim 1, which further includes passing the combusted gas through a nozzle to produce motive power.

13. The method of claim 1:
wherein the high pressure buffer gas is a substantially non-vitiated gas;
which further includes providing at least one fluid inlet port and at least one fluid outlet port disposed adjacent to the passageway of the wave rotor;
which further includes rotating at least one of the passageway and the ports to control the passage of fluid into and out of the wave rotor;
wherein the reintroduction of the buffer gas from said discharging into the passageway does work on the second portion of the combusted gas in the passageway;
which further includes flowing the high pressure buffer gas in the passageway to transfer heat from the structure defining the passageway;
wherein said combusting is initiated from one end of the passageway and a pressure wave travels along the passageway until there is an absence of fuel, and the pressure wave continues along the passageway into the working fluid without fuel to compress the portion of the working fluid to define the high pressure buffer gas.

14. The method of claim 1, wherein the high pressure buffer gas includes a portion of substantially non-vitiated gas and a portion of substantially vitiated gas.

15. The method of claim 1, wherein said discharging the first portion of the combusted gas and purging a second portion of the combusted gas out of the passageway creates a substantially uniform flow from the passageway.

16. The method of claim 1, which further includes storing at least a portion of the high-pressure buffer gas prior to said routing.

17. The method of claim 1, wherein said placing is an intermittent operation.

18. The method of claim 1, wherein said placing is a substantially continuous operation.

19. The method of claim 10, wherein said combusting is initiated by a high energy spark device.

20. The method of claim 11, when said portion of the buffer gas flows along at least a portion of the structure to be cooled.

21. The method of claim 1:
wherein said combusting is defined by a detonating combustion process;
which further includes providing at least one fluid inlet port and at least one fluid outlet port disposed adjacent to the passageway of the wave rotor;
which further includes rotating at least one of the passageway and the ports to control the passage of fluid into and out of the wave rotor and through the ports;
wherein the reintroduction of the buffer gas from said discharging into the passageway does work on the second portion of the combusted gas in the passageway;
which further includes flowing the high pressure buffer gas in the passageway to transfer heat from the structure defining the passageway; and
wherein said detonating is initiated from one end of the passageway and a detonation wave travels along the passageway until there is an absence of fuel, and a pressure wave continues along the passageway into the working fluid without fuel to compress the portion of the working fluid to define the high pressure buffer gas.

22. The method of claim 1, wherein said combusting is defined by a deflagration combustion process.

23. The method of claim 4, wherein said combusting is defined by a deflagration combustion process.

24. The method of claim 13, wherein said combusting is defined by a deflagration combustion process.

25. A method, comprising
providing a wave rotor device including a rotatable rotor with a plurality cells adapted for the passage of fluid therethrough, the rotor having a direction of rotation;
rotating the rotor to pass the plurality of cells by a plurality of inlet ports and a plurality of outlet ports;
flowing a working fluid through one of the plurality of inlet ports and into at least one of the cells;
introducing a fuel into the at least one of the cells at the inlet end portion;
detonating the fuel and a first portion of the working fluid within the at least one of the cells, said detonating forming combusted gas and compressing a second portion of the working fluid to define a high pressure buffer gas;
discharging the high pressure buffer gas through one of the plurality of outlet ports;
discharging a first portion of the combusted gas through another of the plurality of outlet ports; and
routing in the direction of rotation of the rotor the high pressure buffer gas from the one of the plurality of outlet ports and reintroducing through another of the plurality of inlet ports into the at least one of the cells to discharge a second portion of the combusted gas from the cell.

26. The method of claim 25 wherein each of the cells have a first end and a second end, and the plurality of inlet ports are disposed adjacent the first end, and the plurality of outlet ports are disposed adjacent the second end.

27. The method of claim 25 wherein each of the cells have a first end and a second end, and the plurality of inlet ports and the outlet port for discharging the high pressure buffer gas are located adjacent the first end and the outlet port for discharging the combusted gas is located adjacent the second end.

28. The method of claim 25, which further includes maintaining the flow velocity of the second portion of the combusted gas exiting through the another of the plurality of outlet ports.

29. The method of claim 25, which further includes precompressing the working fluid prior to said flowing.

30. The method of claim 25, which further includes compressing the second portion of the combusted gas remaining in the cell after said discharging with said high pressure buffer gas.

31. The method of claim 25, wherein said detonating is initiated from one end of a cell and a detonation wave travels along the cell until there is an absence of fuel, and a pressure wave continues along the cell into the working fluid without fuel to compress the portion of the working fluid to define the high pressure buffer gas.

32. The method of claim 25, wherein the buffer gas is a substantially non-vitiated gas.

33. A method, comprising
providing a wave rotor device including a plurality of stationary passageways adapted for the passage of fluid therethrough;
rotating a plurality of inlet ports and a plurality of outlet ports by the plurality of stationary passageways to control the passage of fluid into and out of the stationary passageways, the plurality of ports having a direction of rotation;
flowing a working fluid through one of the plurality of inlet ports and into at least one of the stationary passageways;
introducing a fuel into the at least one of the stationary passageways;
detonating the fuel and a first portion of the working fluid within the at least one of the stationary passageways, said detonating forming combusted gas and compressing a second portion of the working fluid to define a high pressure buffer gas;
discharging the high pressure buffer gas through one of the plurality of outlet ports;
discharging a first portion of the combusted gas through another of the plurality of outlet ports; and
routing in the direction of rotation of the ports the high pressure buffer gas from the one of the plurality of outlet ports and reintroducing through another of the plurality of inlet ports into the at least one of the stationary passageways to discharge a second portion of the combusted gas from the passageway.

34. The method of claim 33, wherein each of the plurality of stationary passageways have a first end and a second end, the plurality of inlet ports are disposed adjacent the first end and the plurality of outlet ports are disposed adjacent the second end.

35. The method of claim 33, wherein each of the stationary passageways have a first end and a second end, the plurality of inlet ports and the outlet port for discharging the high pressure buffer gas are located adjacent the first end and the outlet port for discharging the combusted gas is located adjacent the second end.

36. The method of claim 33, which further includes maintaining the flow velocity of the second portion of the combusted gas existing through the plurality of outlet ports.

37. The method of claim 33, which further includes compressing the second portion of the combusted gas remaining in the cell after said discharging with said high pressure buffer gas.

38. A pressure wave apparatus, comprising:
a structure having a plurality of passageways therethrough adapted for gas flow;
a pair of exit ports disposed in fluid communication with said structure and adapted to receive fluid exiting from said plurality of passageways, one of said pair of exit ports is a combusted gas exit port adapted to discharge a combusted gas from at least one of said plurality of passageways and the other of said pair of exit ports is a buffer gas exit port adapted to discharge buffer gas from said at least one of said plurality of passageways;
a pair of inlet ports disposed in fluid communication with said structure and adapted to introduce fluid to said plurality of passageways, one of said pair of inlet ports is a working fluid inlet port adapted to allow the passage of a working fluid into said at least one of said plurality of passageways and the other of said pair of inlet ports is a buffer gas inlet port adapted to allow the passage of the buffer gas into said at least one of said plurality of passageways, said buffer gas inlet port is positioned adjacent to and sequentially prior to said working fluid inlet port;
a passageway coupled between said buffer gas exit port and said buffer gas inlet port for the delivery of the buffer gas to said at least one of said plurality of passageways; and
one of said plurality of ports and said structure defines a rotatable component, said component is rotatable to control the alignment of said at least one of said plurality of passageways with each of said ports, wherein said passageway is adapted to deliver the buffer gas in the direction of rotation to the buffer gas inlet port.

39. The apparatus of claim 38, wherein said structure is a wheel having said plurality of passageways spaced thereround.

40. The apparatus of claim 38, which further includes a fuel delivery device in fluid communication with said plurality of passageways and adapted to deliver a fuel thereto.

41. The apparatus of claim 40, wherein the fuel and a first portion of the working fluid is detonated within said at least one of said plurality of passageways and a second portion of the working fluid is compressed to define the buffer gas exiting the buffer gas exit port.

42. The apparatus of claim 41, wherein said structure having said plurality of passageways is rotatable relative to said plurality of ports.

43. The apparatus of claim 41, wherein said plurality of ports is rotatable relative to said structure including said plurality of passageways.

44. A method, comprising:
introducing a quantity of working fluid into a passageway of a wave rotor;
placing a fuel within one end of the passageway;
detonating the fuel within the passageway and creating a quantity of combusted gas adjacent the one end of the passageway and compressing a portion of the working fluid within the passageway to define a high pressure buffer gas adjacent the combusted gas within the passageway;
discharging the high pressure buffer gas out of the passageway;
discharging a first portion of the combusted gas out of the passageway; and
routing the high pressure buffer gas from said discharging back into the passageway to purge a second portion of the combusted gas out of the passageway.

45. The method of claim 44, wherein the high pressure buffer gas is a substantially non-vitiated gas.

46. The method of claim 44:
   which further includes providing at least one fluid inlet port and at least one fluid outlet port disposed adjacent to the passageway of the wave rotor; and
   which further includes rotating at least one of the passageway and the ports to control the passage of fluid into and out of the wave rotor and through the ports.

47. The method of claim 44, which further includes flowing the high pressure buffer gas in the passageway to transfer heat from the structure defining the passageway.

48. The method of claim 44, wherein said detonating is initiated from one end of the passageway and a detonation wave travels along the passageway until there is an absence of fuel, and a pressure wave continues along the passageway into the working fluid without fuel to compress the portion of the working fluid to define the high pressure buffer gas.

49. The method of claim 44:
   wherein the high pressure buffer gas is a substantially non-vitiated gas;
   which further includes providing at least one fluid inlet port and at least one fluid outlet port disposed adjacent to the passageway of the wave rotor;
   which further includes rotating at least one of the passageway and the ports to control the passage of fluid into and out of the wave rotor;
   wherein the reintroduction of the buffer gas from said discharging into the passageway does work on the second portion of the combusted gas in the passageway;
   which further includes flowing the high pressure buffer gas in the passageway to transfer heat from the structure defining the passageway;
   wherein said detonating is initiated from one end of the passageway and a detonation wave travels along the passageway until there is an absence of fuel, and a pressure wave continues along the passageway into the working fluid without fuel to compress the portion of the working fluid to define the high pressure buffer gas.

50. The method of claim 46, wherein said routing delivers the buffer gas to a location in the wave rotor in the direction of said rotating.

51. The method of claim 44, wherein said discharging the first portion of the combusted gas and purging a second portion of the combusted gas out of the passageway creates a substantially uniform flow from the passageway.

52. The method of claim 44, which further includes routing a portion of the high pressure buffer gas to cool a structure adapted to receive the combusted gas exiting the passageway.

* * * * *

UNITED STATES PATENT AND TRADEMARK OFFICE
CERTIFICATE OF CORRECTION

PATENT NO.     : 6,449,939 B1                                              Page 1 of 1
DATED          : September 17, 2002
INVENTOR(S)    : Philip Harold Snyder It is certified that error appears in the above-identified patent and that said Letters Patent is hereby corrected as shown below:

Column 10,
Line 31, please remove the paragraph beginning on line 31 and ending on line 55.

Column 11,
Line 16, please insert the following paragraph beginning on line 16:

-- Wave rotor outlet ports 223 and 224 form the outlet port sequence, and multiple outlet port sequences can be integrated into a wave rotor device. In one preferred embodiment, there are two outlet port sequences disposed along the circumference of the wave rotor device. The inlet port sequence and the outlet port sequence are combined with the rotatable rotor to form a pulsed combustion wave rotor engine. Routing of the compressed buffer gas from the buffer gas outlet port 224 into the wave rotor passageways 41 provides for: high pressure flow issuing generally uniformly from the to-turbine outlet port 223; and/or a cooling effect delivered rapidly and in a prolonged fashion to the rotor walls defining the rotor passageways 41 following the combustion process; and/or a reduction and smoothing of pressure in the inlet port 221 thereby aiding in the rapid and uniform admission of working fluid from compressor 21. --

Signed and Sealed this

Eighteenth Day of February, 2003

JAMES E. ROGAN
*Director of the United States Patent and Trademark Office*